United States Patent [19]
Gauvin et al.

[11] Patent Number: 6,061,686
[45] Date of Patent: May 9, 2000

[54] UPDATING A COPY OF A REMOTE DOCUMENT STORED IN A LOCAL COMPUTER SYSTEM

[75] Inventors: William Joseph Gauvin, Leominster; Edward James Taranto, Boston, both of Mass.

[73] Assignee: Digital Equipment Corporation, Houston, Tex.

[21] Appl. No.: 08/882,883

[22] Filed: Sep. 26, 1997

[51] Int. Cl.[7] .................................................. G06F 17/30
[52] U.S. Cl. ........................... 707/10; 707/513; 709/218; 709/229
[58] Field of Search .................... 707/10, 9, 201, 707/3, 8, 513, 1; 395/200.33, 200.35, 200.59; 705/14

[56] References Cited

U.S. PATENT DOCUMENTS

| | | | |
|---|---|---|---|
| 5,245,553 | 9/1993 | Tanenbaum | 395/200.67 |
| 5,649,186 | 7/1997 | Ferguson | 707/10 |
| 5,701,451 | 12/1997 | Rogers et al. | 707/1 |
| 5,708,780 | 1/1998 | Levergood et al. | 395/200.59 |
| 5,727,129 | 3/1998 | Barrett et al. | 706/10 |
| 5,737,619 | 4/1998 | Judson | 707/500 |
| 5,740,549 | 4/1998 | Reilly et al. | 705/14 |
| 5,758,343 | 5/1998 | Vigil et al. | 707/10 |
| 5,761,683 | 6/1998 | Logan et al. | 707/513 |
| 5,778,389 | 7/1998 | Pruett et al. | 707/204 |
| 5,781,909 | 7/1998 | Logan et al. | 707/200 |
| 5,784,058 | 7/1998 | LaStrange et al. | 345/340 |
| 5,802,299 | 9/1998 | Logan et al. | 395/200.48 |
| 5,805,824 | 9/1998 | Kappe | 395/200.72 |
| 5,845,299 | 12/1998 | Arora et al. | 707/513 |

OTHER PUBLICATIONS

O'Donnell, Ladd and Brown, Special Edition: Using Microsoft Internet Explorer 3, pp. 87, 100 and 101.

*Primary Examiner*—Paul R. Lintz
*Assistant Examiner*—Ella Colbert
*Attorney, Agent, or Firm*—Hamilton, Brook, Smith & Reynolds, P.C.

[57] ABSTRACT

In response to a command by a local computer system, a copy of a remote document is downloaded onto a remote update network device from an origin network device. A predetermined time after the remote document copy is downloaded, the update network device interfaces with the origin network device to compare the remote document with the remote document copy. If the remote document has been modified since it was copied onto the update network device, the remote document copy is updated to reflect the modifications. When the local computer system reconnects to the network, the updated remote document copy may be downloaded into the memory of the local computer system if the remote document copy on the update network device is different than a local copy of the remote document stored in the local computer system.

30 Claims, 21 Drawing Sheets

UPDATING A COPY OF A REMOTE DOCUMENT STORED IN A LOCAL COMPUTER SYSTEM

FIELD OF THE INVENTION

This invention relates generally to data transmission networks and, more particularly, to updating a copy of a remote document stored in a local computer system.

BACKGROUND OF THE INVENTION

FIG. 1 shows a commonly used network arrangement in which a plurality of local computer systems in a local area network (LAN) may access a plurality of remote servers through the Internet. Each remote server may include World Wide Web sites (web sites) that each include a plurality of World Wide Web pages (web pages). Each local computer system may access the remote web sites with web browser software, such as Netscape Navigator™, available from Netscape Communications Corporation of Mountain View, Calif.

The World Wide Web is a collection of servers on the Internet that utilize the Hypertext Transfer Protocol (HTTP). HTTP is a known application protocol that provides users with access to files (which can be in different formats, such as text, graphics, images, sound, and video) using a standard page description language known as Hypertext Markup Language (HTML). HTML is used to transmit data and instructions between a remote computer and a local computer in a form that is understandable to the browser software on the local computer.

While accessing a remote web page from an origin remote network device, it often is desirable to download a copy of such web page into the local, non-volatile memory of the local computer system for review at a later time. This can save the time that it takes to retrieve the document at a later time, and also enable the web page to be reviewed while disconnected from the network. Problems arise, however, when the remote web page is modified on the origin network device while the local computer system is disconnected from the network. For example, the web page could include information relating to daily stock quotes and thus, require daily updating. Accordingly, when the local computer reaccesses the remote web site after being disconnected for a relatively long time period (such as one week in this example), it is necessary for the exemplary web page to be updated to convey accurate information.

Currently, there are several known methods of updating the stored web page after reconnect. A first method requires that a user manually reaccess the origin network site, check to see if the exemplary web page has been modified since it was downloaded, delete the existing copy of the exemplary web page if the web page has been updated, and then download a copy of the modified web page. This process is time consuming and inconvenient. A second method (e.g., MICROSOFT INTERNET EXPLORER™ 3.0, available from Microsoft Corporation) automates the above noted manual process. Such a process also is inefficient, however, because it requires that the local computer system perform a number of logical steps prior to downloading a modified copy of the remote web page. This increases the local processor usage and thus, is time consuming.

Accordingly, it would be desirable to have an apparatus and method that efficiently updates a network document, stored in the non-volatile memory of a local computer system, when the local computer system reconnects to the network.

SUMMARY OF THE INVENTION

In accordance with one aspect of the invention, in response to a command by a local computer system, a copy of a remote document is downloaded onto a remote update network device from an origin network device. A predetermined time after the remote document copy is downloaded, the update network device interfaces with the origin network device to compare the remote document with the remote document copy. This may be done by comparing the last update times of each document. If the remote document has been modified since it was copied onto the update network device, the remote document copy is updated to reflect the modifications. This process may continue periodically until the local computer system re-connects to the network. At that time, the update server determines if the remote document copy (on the update network device) is different than a local copy of the remote document stored in the local computer system. If different, the updated copy is downloaded onto the local computer system. All the processing for this process is performed by the update server, thus saving processor time of the local computer system.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF ILLUSTRATIVE EMBODIMENTS

Figure 2:
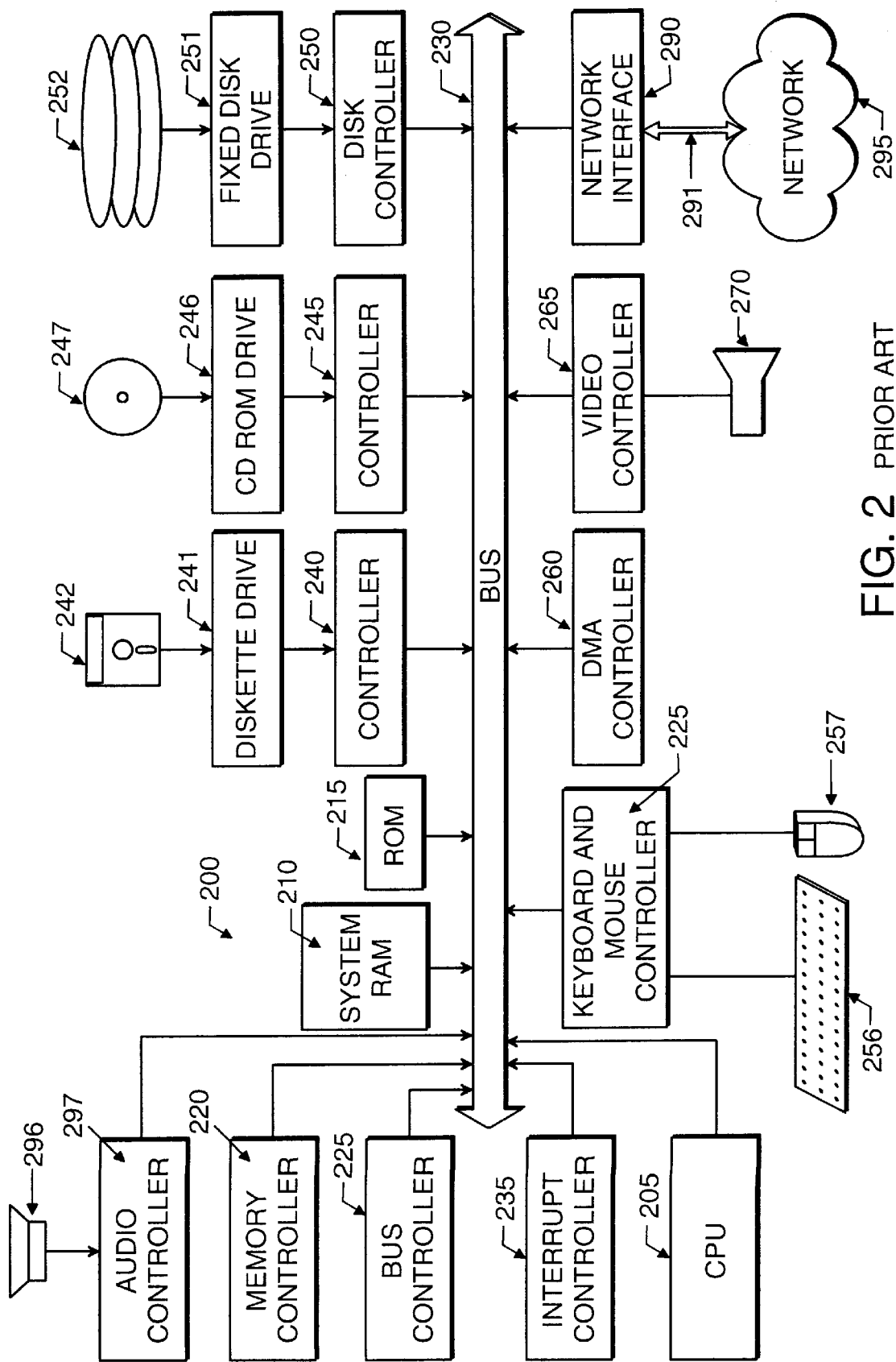
FIG. 2 is a block diagram of a client computer system suitable for use with the disclosed system.

FIG. 2 illustrates the system architecture for an exemplary client computer system 200, such as an IBM THINKPAD 701® computer or Digital Equipment Corporation HiNote™ computer, on which the disclosed network access system (system) can be implemented. The exemplary computer system of FIG. 2 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 3.

The client computer 200 includes a central processing unit (CPU) 205, which may include a conventional microprocessor, random access memory (RAM) 210 for temporary storage of information, and read only memory (ROM) 215 for permanent storage of information. A memory controller 220 is provided for controlling system RAM 210. A bus controller 225 is provided for controlling bus 230, and an interrupt controller 235 is used for receiving and processing various interrupt signals from the other system components.

Mass storage may be provided by diskette 242, CD-ROM 247, or hard disk 252. Data and software may be exchanged with client computer 200 via removable media, such as diskette 242 and CD-ROM 247. Diskette 242 is insertable into diskette drive 241, which is connected to bus 230 by controller 240. Similarly, CD-ROM 247 is insertable into CD-ROM drive 246, which is connected to bus 230 by controller 245. Finally, the hard disk 252 is part of a fixed disk drive 251, which is connected to bus 230 by controller 250.

User input to the client computer 200 may be provided by a number of devices. For example, a keyboard 256 and a mouse 257 may be connected to bus 230 by keyboard and mouse controller 255. An audio transducer 296, which may act as both a microphone and a speaker, is connected to bus 230 by audio controller 297. It should be obvious to those reasonably skilled in the art that other input devices, such as a pen and/or tablet and a microphone for voice input, may be connected to client computer 200 through bus 230 and an appropriate controller. DMA controller 260 is provided for performing direct memory access to system RAM 210. A visual display is generated by a video controller 265, which controls video display 270.

Figure 1:
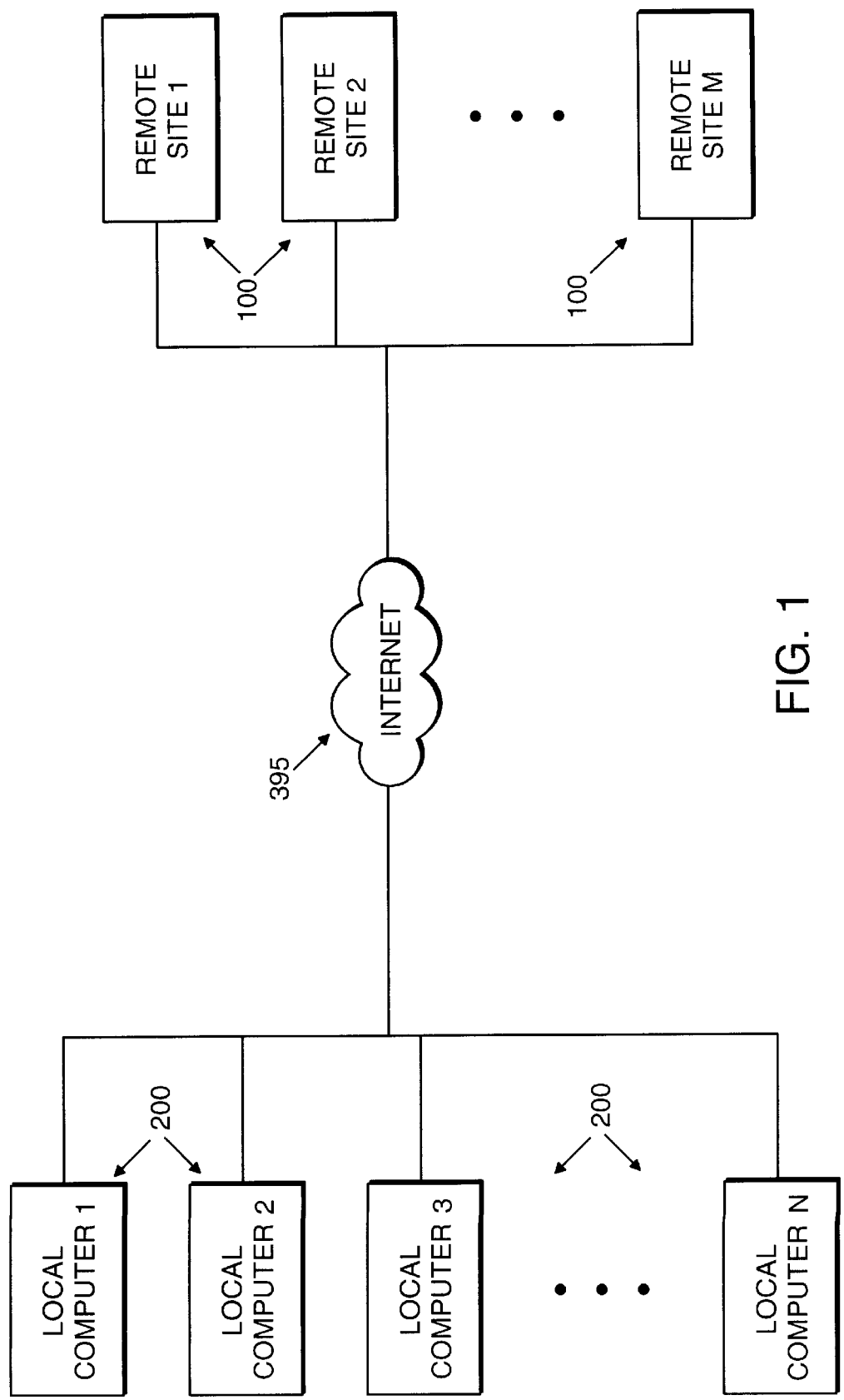
FIG. 1 is a block diagram of a generic network configuration that may be used with the disclosed system.

Client computer 200 also includes a network adapter 290 that allows the client computer 200 to be interconnected to a network 295 via a bus 291. The network 295, which may be a local area network (LAN), a wide area network (WAN), or the Internet 395, may utilize general purpose communication lines that interconnect a plurality of network devices. FIG. 1 shows one network arrangement for use with the system in which a plurality of local computer systems (client computers 200) in a LAN are connected to the a plurality of remote network sites 100 via the Internet 395. The remote sites 100 may be World Wide Web sites (web sites), stored on one or more remote network devices, that each include a plurality of web pages. Each accessible web site may be accessed with web browser software 399 (FIG. 3B), such as Netscape Navigator™, available from Netscape Communications Corporation of Mountain View, Calif.

Client computer system 200 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Figure 3A:
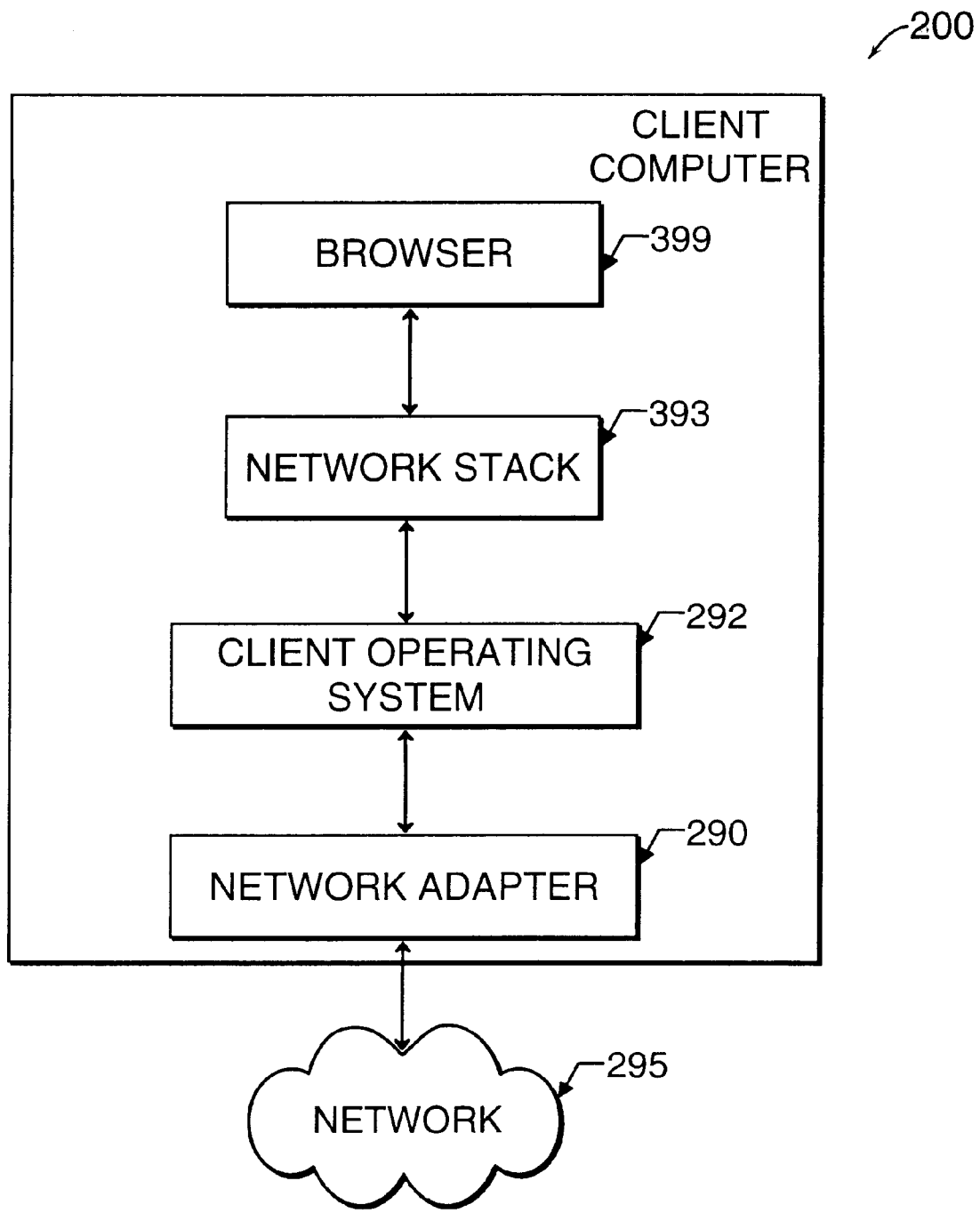
FIG. 3A is a block diagram of a prior art client computer.
Figure 3B:
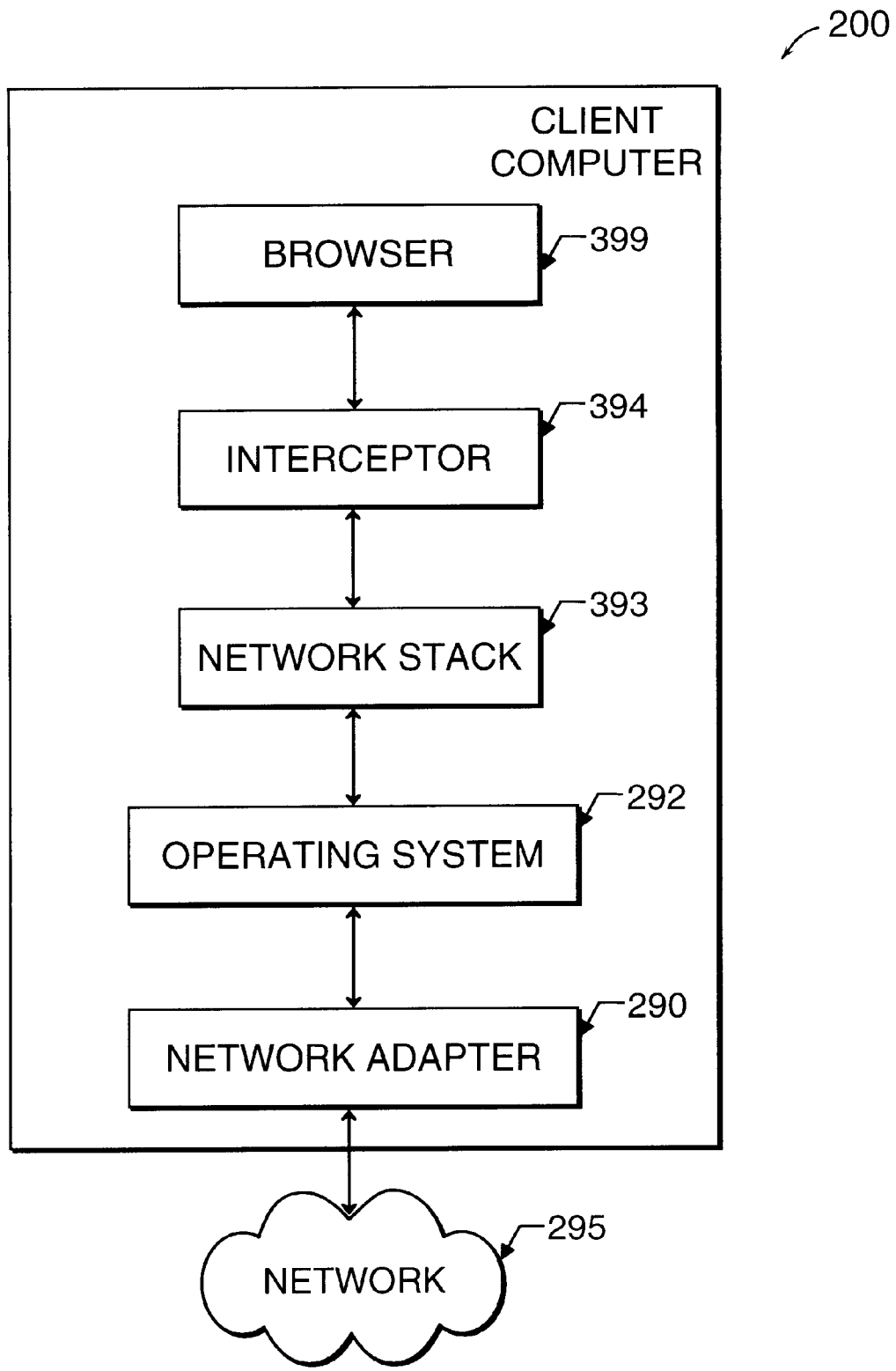
FIG. 3B is a block diagram of the client computer shown in FIG. 3A with the disclosed system.

FIG. 3A shows in more detail a prior art configuration of the client computer 200 connected to a network. Specifically, the client computer 200 includes the network adapter 290, the operating system 292, a network protocol stack 393 (e.g., Microsoft TCP/IP®, from Microsoft Corp.), and the browser 399. The browser 399 transmits requests to the network stack 393, which processes the requests and transmits them to the network 295 via the network adapter 290 and operating system 292. Similarly, responses from the network 295 are received by the network stack 393, via the network adapter 290 and operating system 292, and then provided to the browser 399. When downloading a remote web page from a remote server, for example, the browser 399 first transmits a request for the web page, with the web page Uniform Resource Locator ("URL"), to the network stack 393. The network stack 393 responsively locates the remote server and then transmits the request to the remote server via the operating system 292 and network adapter 290. The web page then is transmitted to the network adapter 290, via the network 295, and received by the network stack 393. The retrieved web page then is provided to the browser 399 for display on the client computer 200.

Improving on the configuration shown above in FIG. 3A, FIG. 3B shows a preferred embodiment of the system. Specifically, an interceptor 394 is added to the client computer 200 to intercept transmissions between the browser 399 and the network stack 393. Such transmissions may be a request by the browser 399 to access a web page on a remote server. Upon receipt of such transmissions, the interceptor 394 provides improved functionality for the client computer 200. Among the improvements is the capability of accessing locally stored web pages through the browser 399 without requiring that the user either preconfigure the browser 399, or notify the browser 399 that the client computer 200 is disconnected from the network 295.

The system thus includes the interceptor 394 and a mechanism for ascertaining if the client computer 200 is connected to the network 295. If the client computer 200 is connected to the network 295, the address (i.e., URL) of the web page is determined from the request. A fetch command then is transmitted to the remote server having the web page, thereby causing the client computer 200 to download the web page from the remote server. Conversely, if the client computer 200 is not connected to the network 295, the system includes a mechanism for locating the web page in the memory of the client computer 200 if such web page already had already been downloaded. The downloaded web page preferably is stored in a local directory structure constructed as discussed below with reference to FIGS. 11C, 11D, and 11E.

Use of the interceptor 394 thus enables the user to access a web page via the browser 399, during disconnect, in a manner similar to that when the client computer 200 is connected to the network 295. The user thus may access the downloaded web page without knowing if the client computer 200 is connected to or disconnected from the network 295.

In accordance with another aspect of the system, a mechanism also may be included for automatically updating a downloaded copy of a remote document (e.g., a web page from an origin web site), stored on a disconnected client computer 200, when such client computer 200 reconnects to the network 295. This update captures any modifications made to the web page at the origin web site while the client computer 200 was not connected to the network 295 (i.e., during disconnect). This aspect of the system (referred to herein as "autoupdate") updates the downloaded web page copy with a minimum of client computer processor usage, thereby maximizing the speed and efficiency of the client computer 200 during the update process.

Figure 5:
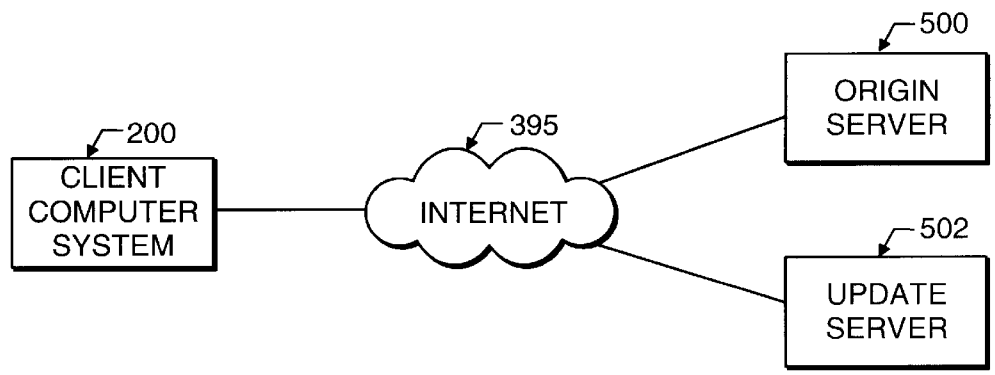
FIG. 5 is an exemplary network configuration that may be used with the autoupdate system.

FIG. 5 shows an exemplary network configuration that includes the autoupdate system. The network 295 includes a plurality of network devices that may be interconnected by the Internet 395. The network devices include an origin network device 500 ("origin server 500") having the web site with a web page, the client computer 200 for accessing the origin server 500 and displaying a web page retrieved from the origin server 500, and an update network device ("update server 502"). The update server 502, which may service many client computers as described below, may be a general purpose computer having software for implementing the autoupdate function.

The autoupdate function, which in the preferred embodiment is a background process, may be initiated when the downloaded web page (client copy) is displayed on the client computer 200. When initiated, a copy of the web page (update copy) is uploaded into the memory of the update server 502 from the origin server 500. When the client computer 200 subsequently disconnects from the network 295, the update server 502 periodically accesses the origin server 500 to ascertain if the web page is different than the update copy. As discussed in greater detail below, this may be done by comparing the last update time of the update copy with the last update time of the web page on the origin server 500. If the web page is different, the update copy is modified to reflect the differences. This may be done by directly overwriting the update copy with a copy of the (modified) web page.

When the client computer 200 reconnects to the network 295, it automatically reaccesses the update server 502. If the client copy is different than the update copy at such time, the client copy is modified to reflect the differences. This too may be done by directly overwriting the client copy with a copy of the update copy. In the preferred embodiment, the autoupdate process repeats each time that the client computer 200 disconnects from and reconnects to the network 295. The autoupdate process preferably continues until the client copy of the web page is deleted from the memory of the client computer 200. Alternatively, the autoupdate function may be turned off by accessing a control panel via the configure button 402. The details of one method for implementing this process are discussed below. As shown below, the autoupdate efficiently updates the client copy by utilizing the processor time of the update server 502 instead of the processor time of the client computer 200.

Figure 6:
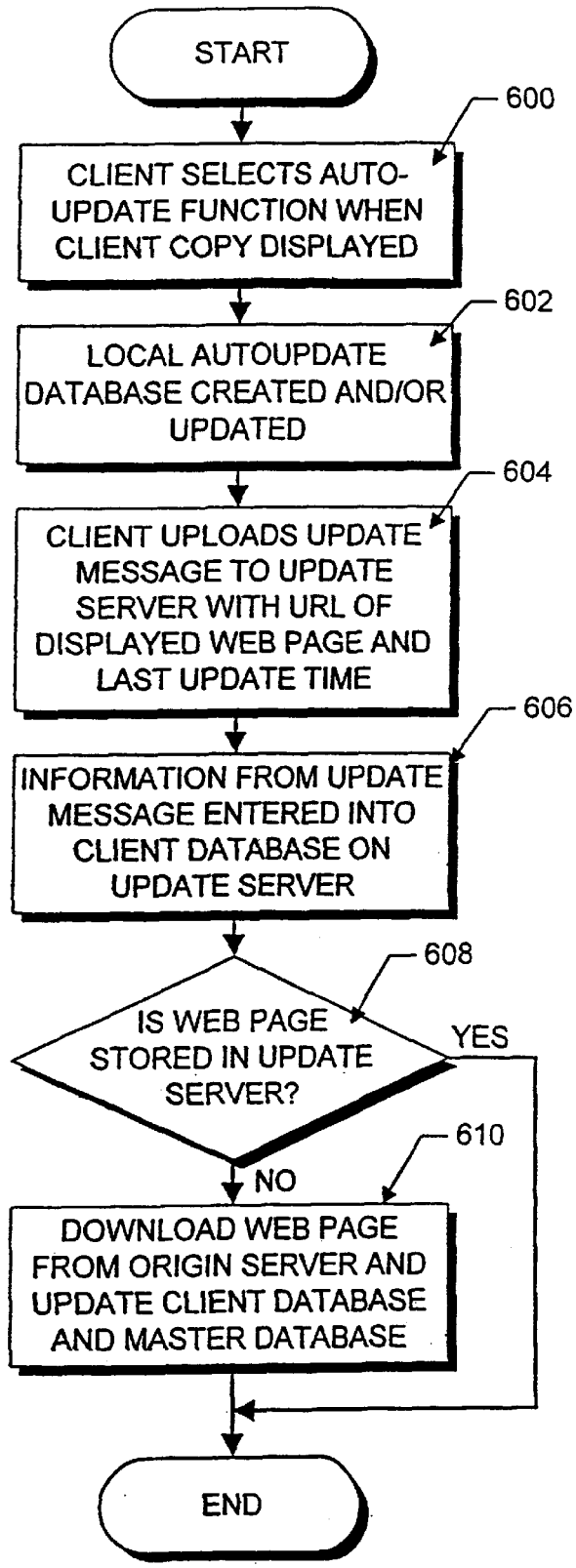
FIG. 6 is a flow chart illustrating a process for initiating the autoupdate process prior to disconnect.

Specifically, FIG. 6 is a flow chart illustrating a process for initiating the autoupdate process prior to the time that the client computer 200 disconnects from the network 295. The process begins at step 600 where the autoupdate function is initiated (by the user) while the client copy is displayed on the client computer 200. Illustratively, the process may be initiated by means of a graphical user interface displaying an "autoupdate" button 404 at the bottom of the displayed client copy. After the autoupdate button 404 is selected, the client 200 creates and/or updates a local "autoupdate" database having the fields "URL" and "last update" (step 602). The URL of the client copy is entered under the "URL" field, and the date and time of the last update of the client copy correspondingly is entered under the "last update" field. The client then uploads an update message to the update server 502 specifying the URL of the selected web page and the last update time of such URL on the client 200 (step 604).

At step 606, in response to the update message, the update server 502 modifies a "client" database that is stored on the update server 502. The client database maintains a listing of the web pages being maintained by the update server 502 for each client computer 200, and the last update time of each of the client copies of such web pages. The client database therefore has the fields "client", "web page(s)" and "last update time and date of client copy of the web page." Accordingly, the information from the update message is entered into the appropriate fields in the client database. For example, if the update server 502 is maintaining two web pages for the client computer 200, the client database will have two records for the client 200. Each of the two records therefore will specify the client 200, the URL of the web page being maintained, and the last update time of the client copy for the maintained web page.

At step 608, it then is ascertained if the selected web page already is stored in the update server 502. If yes, the autoupdate initiation process ends. If no, the update server 502 first downloads the web page from the origin server 500 (creating the update copy), and then modifies a "master" database stored on the update server 502 (step 610). The master database, which maintains a listing of the last update time of each stored update copy on the update server 502, includes fields "URL" and "last update." Accordingly, the URL of the web page is entered under the "URL" field, and the date and time of the last update of the update copy is entered under the "last update" field.

Figure 7:
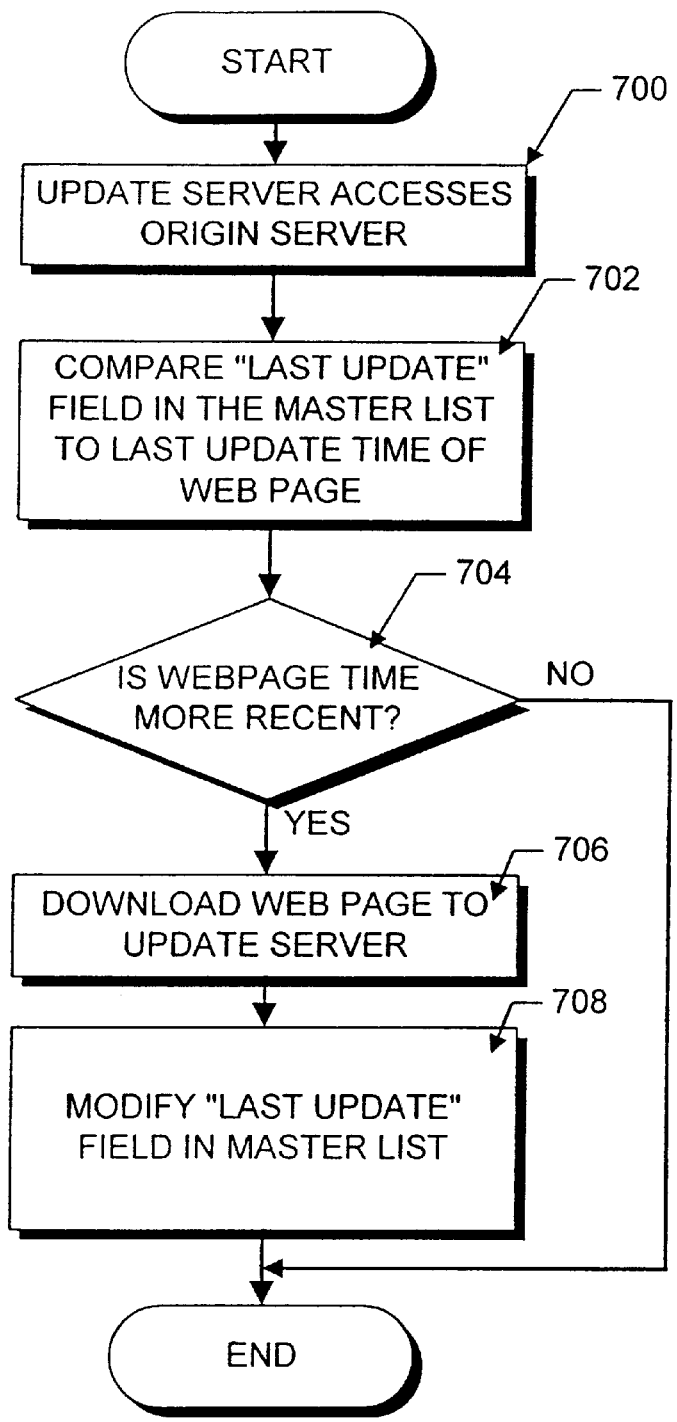
FIG. 7 is a flow chart illustrating a process for updating an update copy during disconnect.

FIG. 7 is a flow chart illustrating a process for maintaining the update copy while the client computer 200 is disconnected from the network 295. Specifically, the update server 502 first accesses the origin server 500 (step 700) and then compares the "last update" field in the master list with the last update time of the web page (step 702) on the origin server 500. The last update time of the web page may be accessed by conventional means. For example, the update server 502 may transmit a message to the origin server 500 requesting a copy of the web page. In response, the origin server 500 may transmit such copy to the update server 502 with a header having the last update time of the web page. At step 704, it then is ascertained if the compared times are different. If the times are not different, the process ends. If different and the last update time of the web page on the origin device is more recent than the last update time of the update copy, the process proceeds to step 706 where a copy of the web page (which has been modified since the previous download onto the update server 502) is downloaded to the update server 502. As noted above, this may be done by overwriting the update copy with the updated web page. After the updated web page is downloaded onto the update server 502, the "last update" field of the master database table is updated for such web page to reflect the recent update (step 708). This process may repeat periodically until the client computer 200 reconnects to the Internet.

Figure 8:
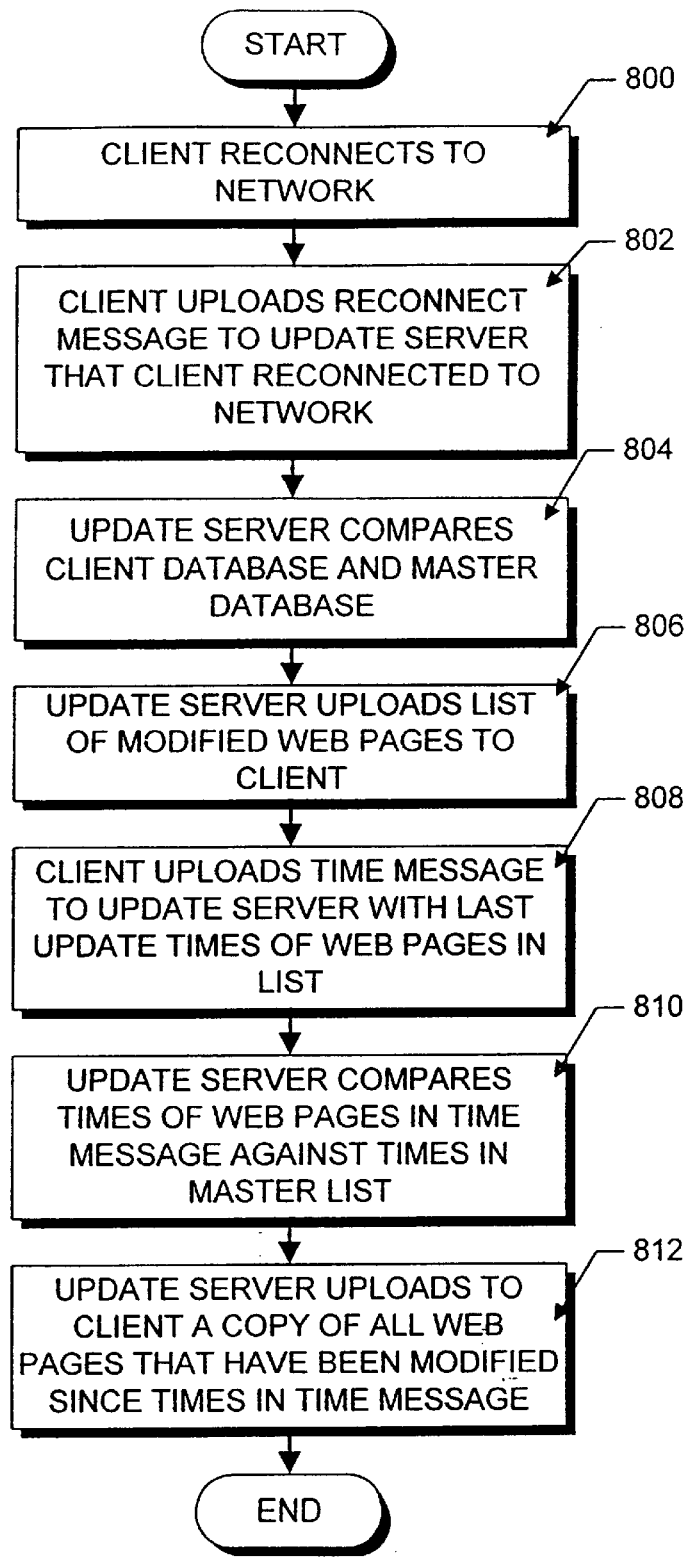
FIG. 8 is a flow chart illustrating a process for updating a client copy after reconnect.

FIG. 8 is a flow chart illustrating a process for updating the client copy when the client computer 200 reconnects to the network 295 (step 800). At step 802, the client computer 200 uploads a reconnect message to the update server 502 notifying the update server 502 that the client 200 is reconnected to the network. The update server 502 accesses its internal client database and master database to determine if any of the client copies must be modified (step 804). This is accomplished by comparing the times of the client copies in the update server client database against the times in the master database. The update server 502 then uploads to the client a list of each client copy that requires modification (step 806).

At step 808, the client responsively uploads a time message to the update server 502 with the last update times of the client copies in the list. These times are retrieved from the local autoupdate database. The update server 502 then compares the times received in the time message against the times in the master database (step 810). At step 812, the update server 502 uploads to the client 200 a copy of all web pages that have been modified since the times in the time message. These web pages are determined by comparing the times received in the time messages to the times stored in the master database.

The above process therefore enables the autoupdate process to be used even when a client computer 200 manually updates the client copy via a network that is not accessible to the update server 502. Specifically, after the client copy is manually updated, the "last update" field in the local autoupdate database consequently is modified to reflect the time of such update. In the event that such time is more recent than the time of the update copy during the comparison in step 810, the process ends, thereby maintaining the manually updated copy of the web page as the most recent client copy of the web page. The update server 502 may then modify the update copy.

Figure 4:
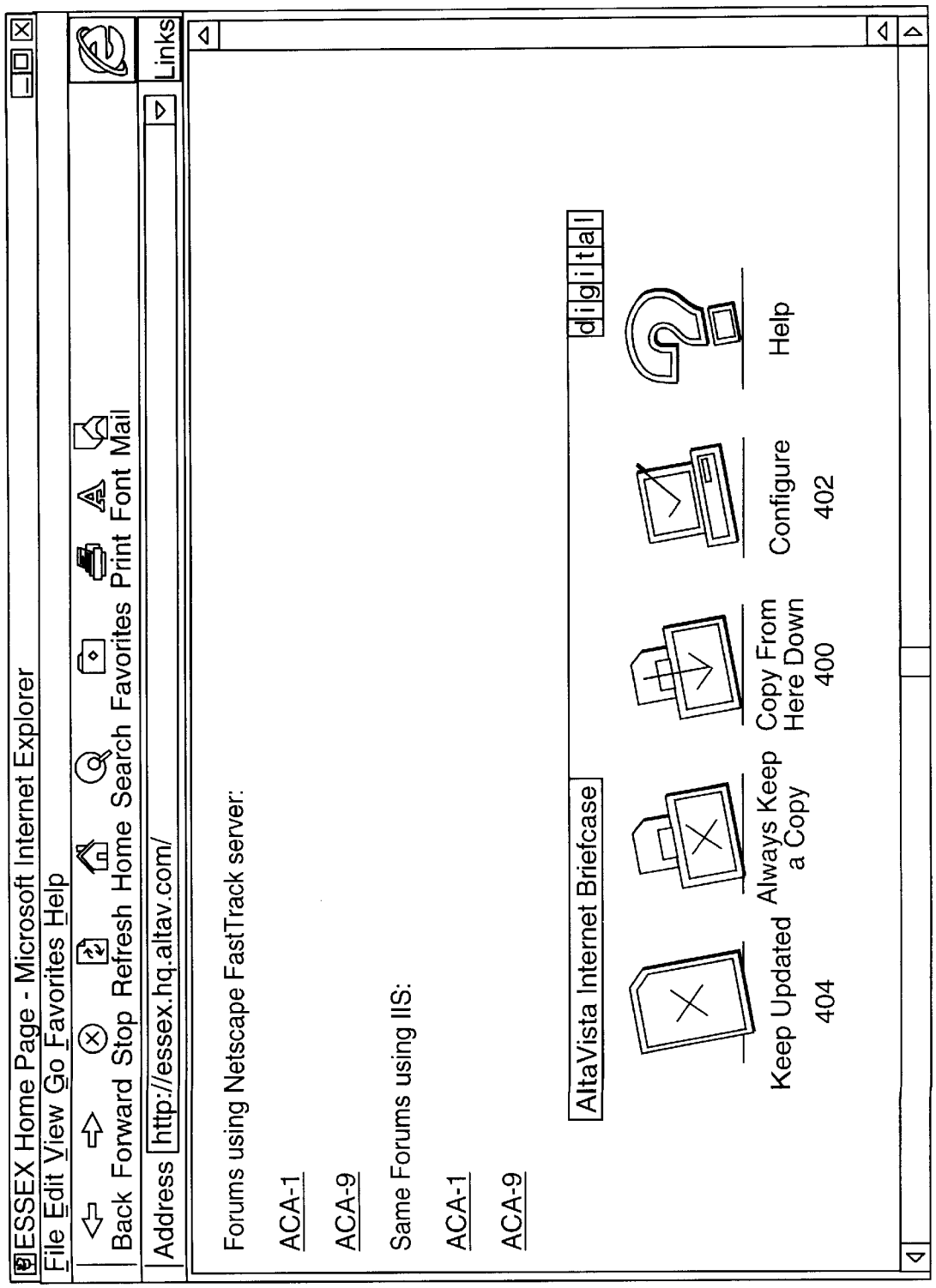
FIG. 4 is an illustration showing the graphical user interface used to initiate the disclosed system.

As previously noted, the update server 502 may periodically access the origin server 500 to update the update copy of the web page. The accessing time period may be configured prior to selection of the autoupdate button 404 by selecting the configure button 402 (FIG. 4). Such time period may be selected based upon the nature of the information contained in the web page. For example, if the web page includes up to the minute stock quotes, it would be desirable to select the time period to be relatively short, such as every ten minutes. Conversely, if the web page includes information relating to scores for weekly football games, it would be desirable to select the time periods to be every seven days.

In an alternative embodiment, the autoupdate process may be used even when a remote web page is not initially stored on the client computer 200. Specifically, when the client computer 200 accesses the web page at the web site, the autoupdate process is initiated. Upon initiation, the process first downloads the selected web page to the client computer 200, and then continues the preferred embodiment of the process as if the downloaded web page was originally stored on the client when the process was initiated.

Groups of remote web pages may be downloaded according to a process referred to as "cache from here down" (CFHD). The CFHD process downloads a set of preselected web pages from a single remote web site into the non-volatile memory of the client computer 200. These preselected web pages may be reviewed when the client computer 200 is disconnected from the network 295. More particularly, when the CFHD process is initiated, a web page displayed by the client computer 200, specified web pages in the same node (i.e., containers that contain web pages) as the displayed web page, and specified web pages in the same branch on nodes below the displayed web page, are automatically downloaded into the non-volatile memory of the client computer 200. The entire web site thus is not downloaded, thereby saving download time and memory on the client computer 200. To that end, indicia may be included on the displayed web page that enables a user to select the CFHD function. FIG. 4, for example, shows such indicia as being a button 400 having the text string, "cache from here down." Selection of this button 400 causes the client computer 200 to execute the CFHD process in the background. Since it is a background process, the entire CFHD process is completed without interrupting the normal execution of the web browser 399. A user therefore may continue browsing any remote site while the selected web pages are being downloaded.

Figure 9:
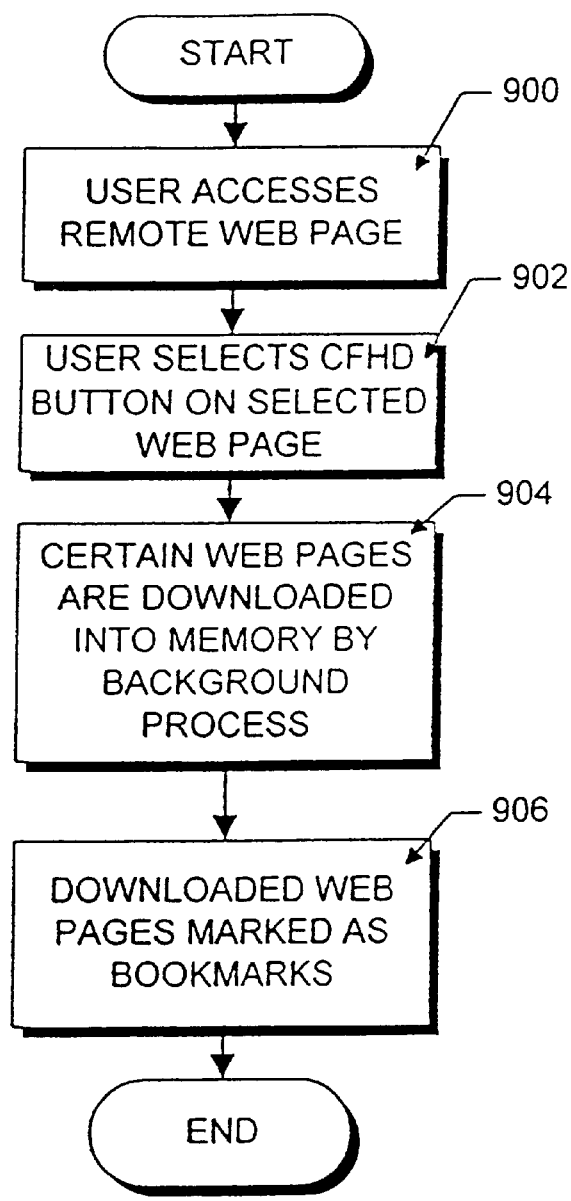
FIG. 9 is a flow chart illustrating a process for downloading selected web pages onto the client computer.

FIG. 9 is a flow chart illustrating a process that may be used for downloading the web pages into the non-volatile memory of the client computer 200 from a remote web site. At step 900, a user accesses and downloads a remote web page. Such a remote web page may be automatically stored in the non-volatile memory of the client computer 200. The CFHD button 400 then is selected at step 902 to initiate the CFHD background process. This causes the browser 399 to transmit a request to the interceptor 394, which performs the remaining steps of the process (see FIGS. 10–11E). Copies of the selected web page (i.e., the root web page), certain web pages in the same node as the selected web page, and certain web pages in the same branch on nodes within a preselected number of levels below the selected web page node, then are downloaded into the non-volatile memory of the client computer 200 at step 904. This process creates a local directory structure (discussed below) in the client computer 200 for efficiently filing the downloaded web pages. At step 906, the downloaded web pages may be tagged as a bookmark in the web browser 399 for future access. The downloaded web pages thus may be accessible for display, or other use by selecting either a bookmark or an "open" button in the browser.

In addition to downloading certain web pages between the root node and a preselected number of levels below the root node, the CFHD process also may be configured to download, in preselected instances, web pages on servers that are remote from the server having the root web page. The details of downloading such web pages are discussed in greater detail below with reference to FIGS. 10 through 11E. Although the CFHD process may be implemented with default values for all of the necessary parameters, the preselected maximum number of levels below the selected web page may be chosen before the CFHD button 400 is selected. Accordingly, a configure button 402 may be included that enables a user to preselect the maximum number of levels to download onto the client computer 200 from the web site. In addition, the configure button 402 also may include a number of other "filtering" parameters that prevent the computer from downloading and storing certain web pages from the web site (i.e., "filtering" the web pages). One such filtering parameter, for example, may enable the client computer 200 to store only web pages that are less than a preselected size. Web pages that are greater than the preselected size thus are not stored. Another filtering parameter may prevent the client computer 200 from storing web pages resident on network devices that are remote from the network device on which the selected web page is located. Such filtering parameter thus ensures that each of the stored web pages originates from the same remote network device. Yet another filtering parameter may prevent the client computer 200 from storing web pages that are not a preselected type. A type of file is identified by an extension at the end of a URL. For example, no graphic image files (having the extension ".gif") will be stored if such files are selected to be filtered. Similarly, the filtering parameters may be selected to filter out portions of web pages that are in a preselected format. For example, only the text in HTML (Hypertext Markup Language) web pages having both text and references to graphic image files (GIF files having the suffix ".gif") may be downloaded onto the local computer. It should be noted, however, that any combination of the above noted filtering parameters may be selected.

Figure 10:
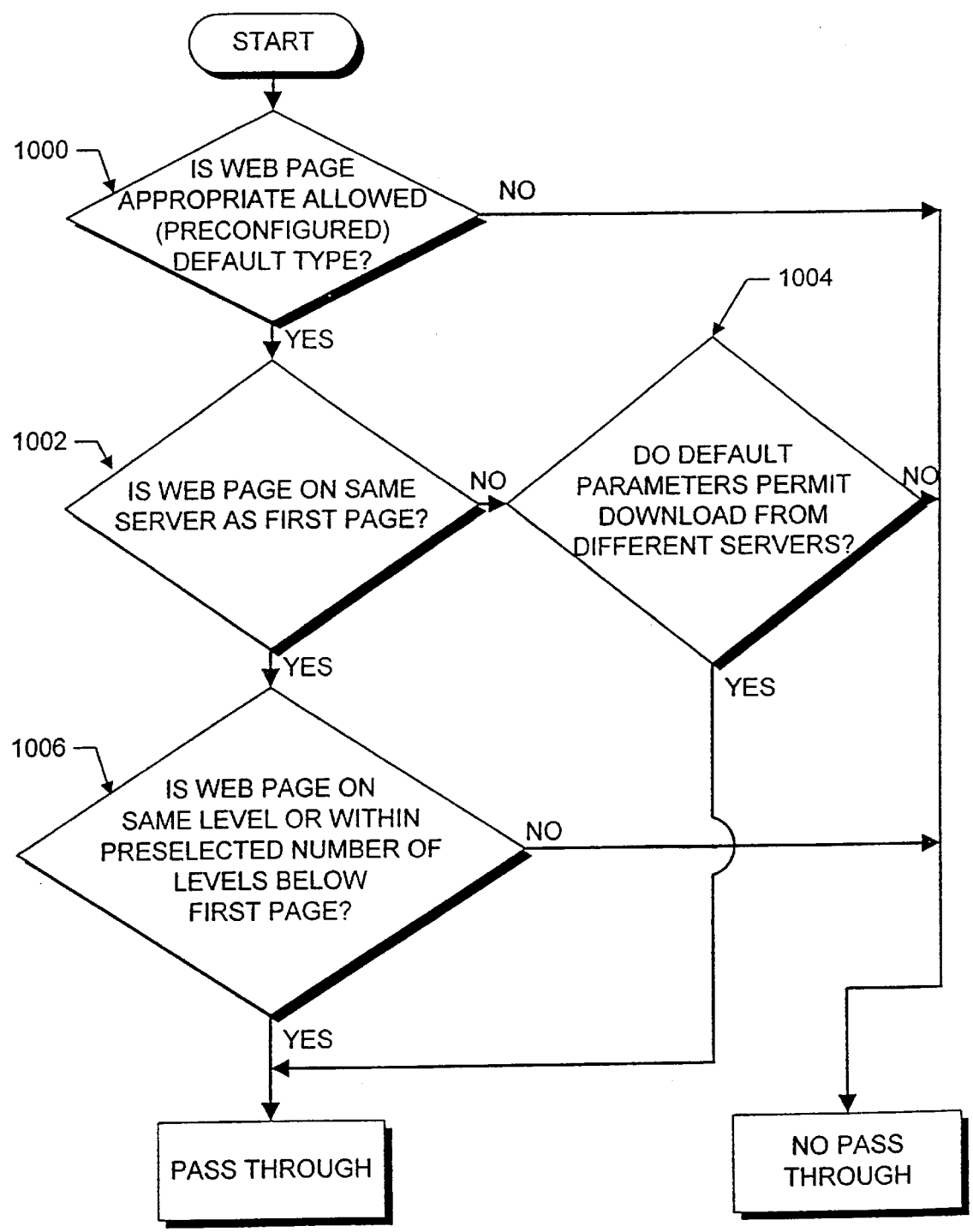
FIG. 10 is a flow chart illustrating a process of filtering web pages in the CFHD system.

FIG. 10 is a flow chart illustrating a process that may be used by to filter the web pages. This process utilizes the URL of the web page being filtered to ascertain the necessary information for processing the web page. Specifically, at step 1000, it is determined if the web page corresponding to the URL under examination is the appropriate type of file. For example, all files except ".gif" files may be an appropriate type. The filter ascertains this by searching the URL of the examined web page for the suffix ".gif", for example, to determine if such web page is such a file. If not the appropriate type, the web page does not pass through. If it is the appropriate type, it then is determined at step 1002 whether the web page is on the same server as the root web page. The filter ascertains this from the URL of the examined web page by comparing its web site designation to that of the root web page. If the URL indicates that the web page under examination is not on the same server, then it is determined at step 1004 whether the filtering parameters were configured to permit a download from a different remote server device than the server device of the root page. If not, then the web page does not pass through the filter. If web pages from remote servers are allowed, then the web page successfully passes through the filter.

Returning to step 1002, if the web page under examination is on the same server device as the root web page, it then is determined at step 1006 if the examined web page is on the same level or within a preselected number of levels below that of the first page. This is ascertained by counting the number of forward slashes (i.e., "/") in the URL. If not on the same level or within a preselected number of levels, the web page does not pass through the filter. Otherwise, the web page successfully passes through the filter.

By way of example, a root web page having the URL, "www.altavista.com/creative/index.htm", for example, has all of the necessary information for the above noted filter. The type of file is a ".htm" file, the remote server is "www.altavista.com", and the levels from the root web page may be ascertained by counting the "/" between the node "creative" and the node of the current web page. Continuing with the previous example, since there is no ".gif" suffix in the URL, this web page will pass through the filter.

Figure 11A:
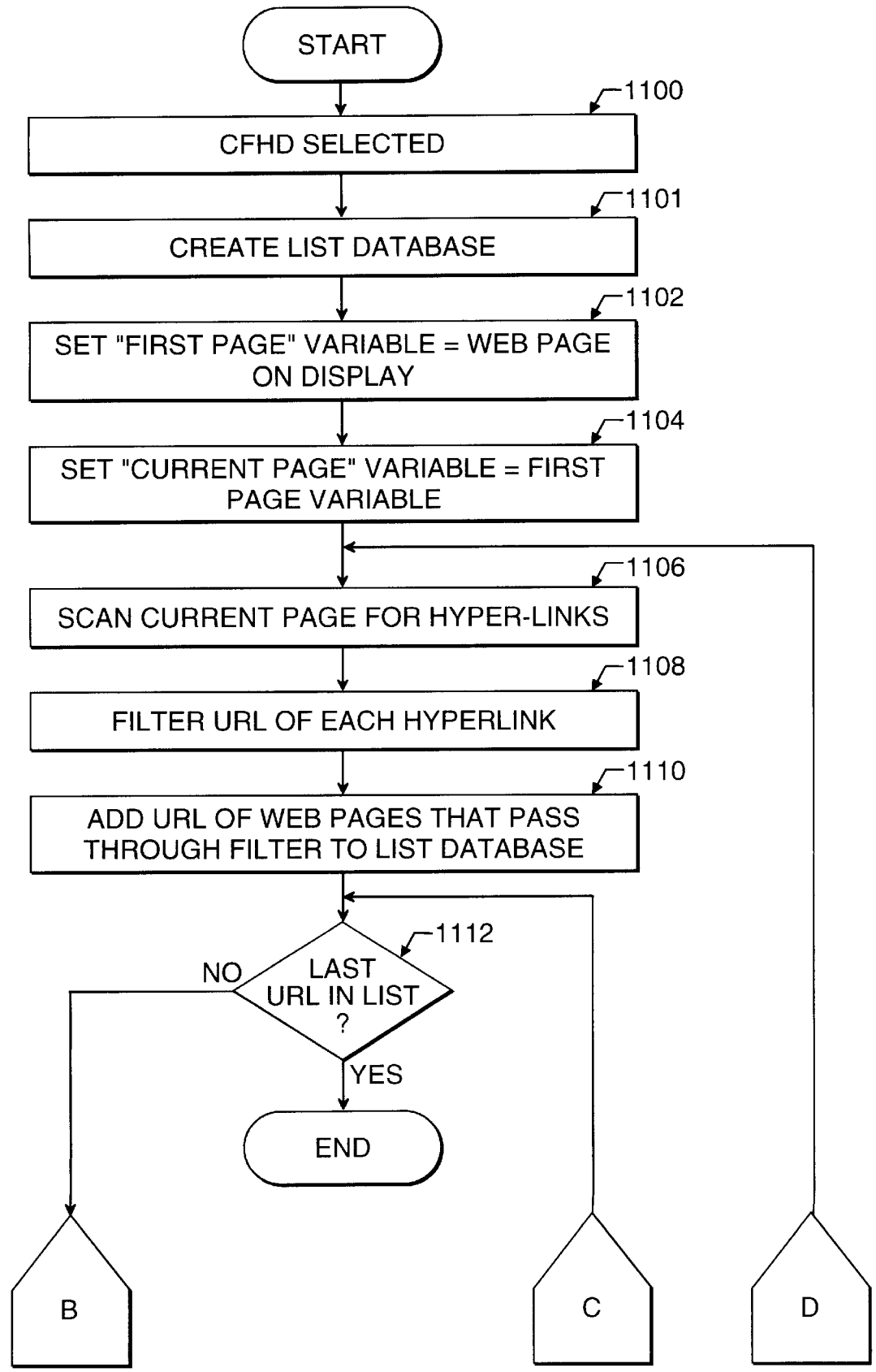
FIGS. 11A and 11B are flow charts illustrating a tree retrieval process that may be utilized with the cache from here down (CFHD) system.
Figure 11B:
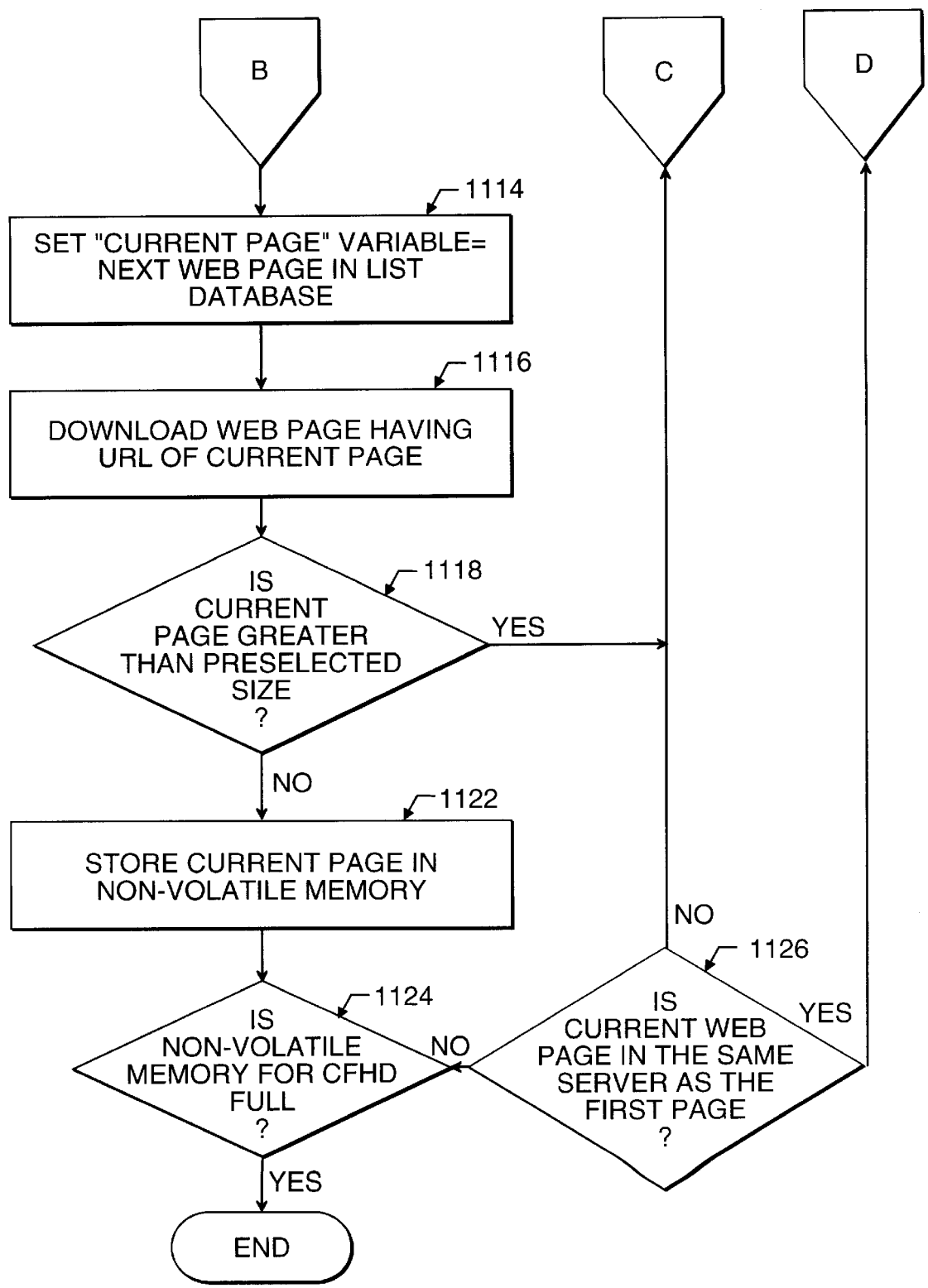

Any known process for downloading the remote web pages in the client computer 200 may be used. A tree retrieval process may be used. This tree retrieval process stores the web pages in a local directory structure that is similar to the hierarchical tree structure on the remote network device. FIGS. 11A and 11B show one such tree retrieval process that may be used to store remote web pages in the client computer 200. Specifically, at step 1100, the CFHD button 400 is selected. At step 1101, a list database is created for storing the URL of each web page to download. A "first page" variable then is set to the web page displayed on the client computer 200 when the CFHD button 400 is selected (step 1102). At step 1104, a "current page" variable also is set to the web page displayed when the CFHD button 400 is selected. The current page then is scanned for hyperlinks at step 1106. This may be done by scanning the stored HTML code for hyperlink tags. At step 1108, the URL (i.e., web page) of each hyperlink is filtered according to several preselected filtering parameters (discussed above with reference to FIG. 10). The URL of web pages that pass through the filter then are added to the list database at step 1110 At step 1112, it then is determined if the URL of the current page is the last URL in the list database. If yes, the tree retrieval process ends.

If such URL is not the last URL in the list database, the process continues with off page connector "B" to step 1114 in which the current page variable is set to the next URL in the list database. The current page then is downloaded onto the memory of the client computer 200 at step 1116 It then is determined at step 1118 if the current page is greater than a preselected size. If it is greater than the preselected size, the process continues with off page connector "C" and loops back to step 1112 (i.e., checking for last URL in list database). This loop prevents the URLs from hyperlinks in the oversized current page from being stored in the list database, and also prevents the current page from being downloaded into the client computer system.

If the web page is not greater than the preselected size, the current page then is stored in non-volatile memory of the client computer (step 1122). At step 1124, it then is determined if the non-volatile memory designated for the CFHD process is full. If it is full, the process ends. If it is not full, it then is ascertained at step 1126 if the current web page is in the same remote server as the first page. If it is not, then the process continues to off page connector "C" and loops back to step 1112 (i.e., checking for last URL in list database). Similar to step 1118, this prevents the URLs from hyperlinks in such current page from being stored in the list database. If it is in the same remote server as the first page (i.e., by comparing the current page against the first page), the process continues to off page connector "D" and loops back to step 1106 (i.e., scanning for hyperlinks).

The list database may be any database that can store one or more URL strings. One such database may be a relational database having a single "URL" field identifying a URL address. Such a list database is formed and accessed by the interceptor 394 only and thus, is inaccessible to a user.

Figure 11C:
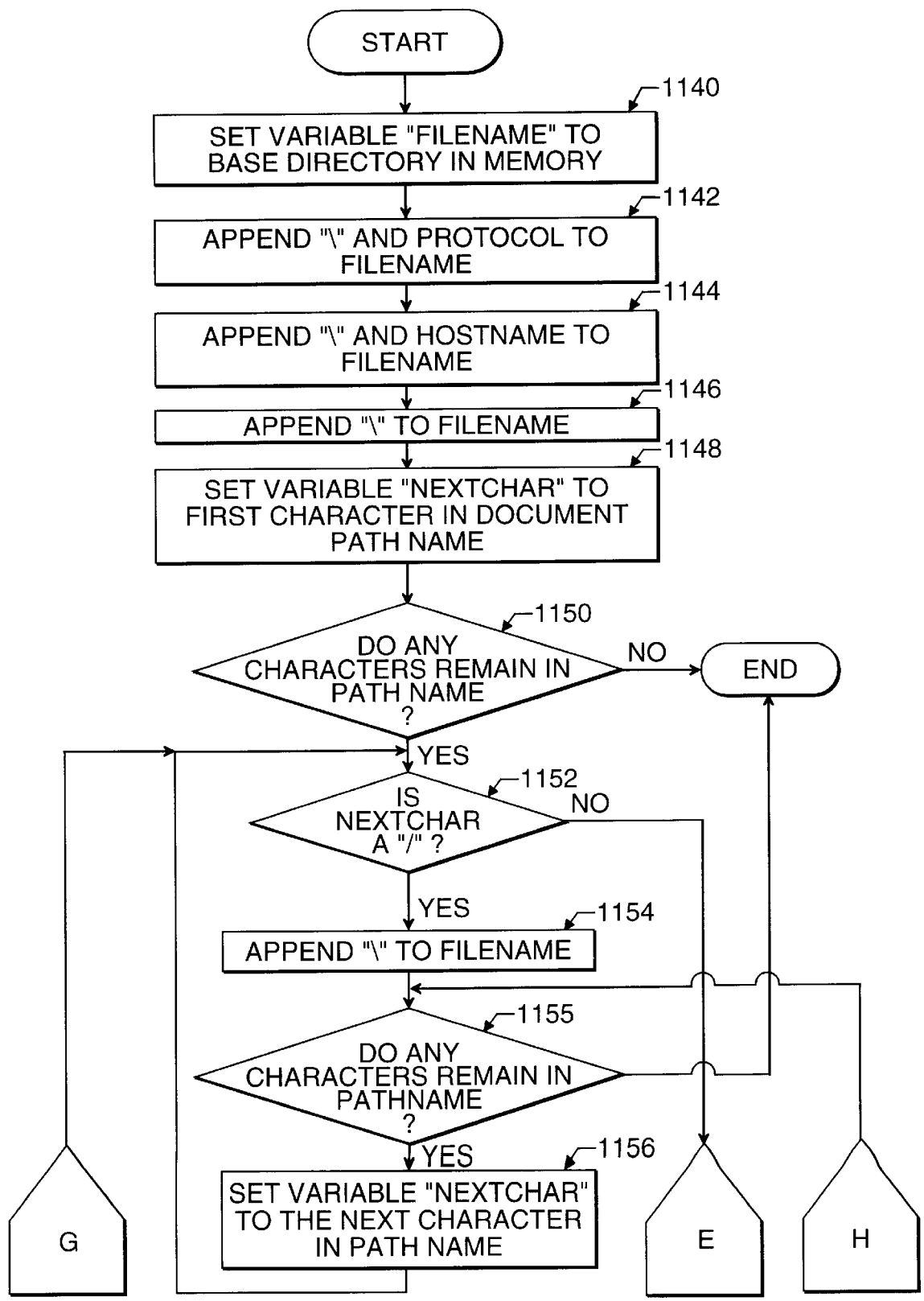
FIGS. 11C, 11D, and 11E are flow charts that collectively illustrate a process of creating a local directory structure.
Figure 11D:
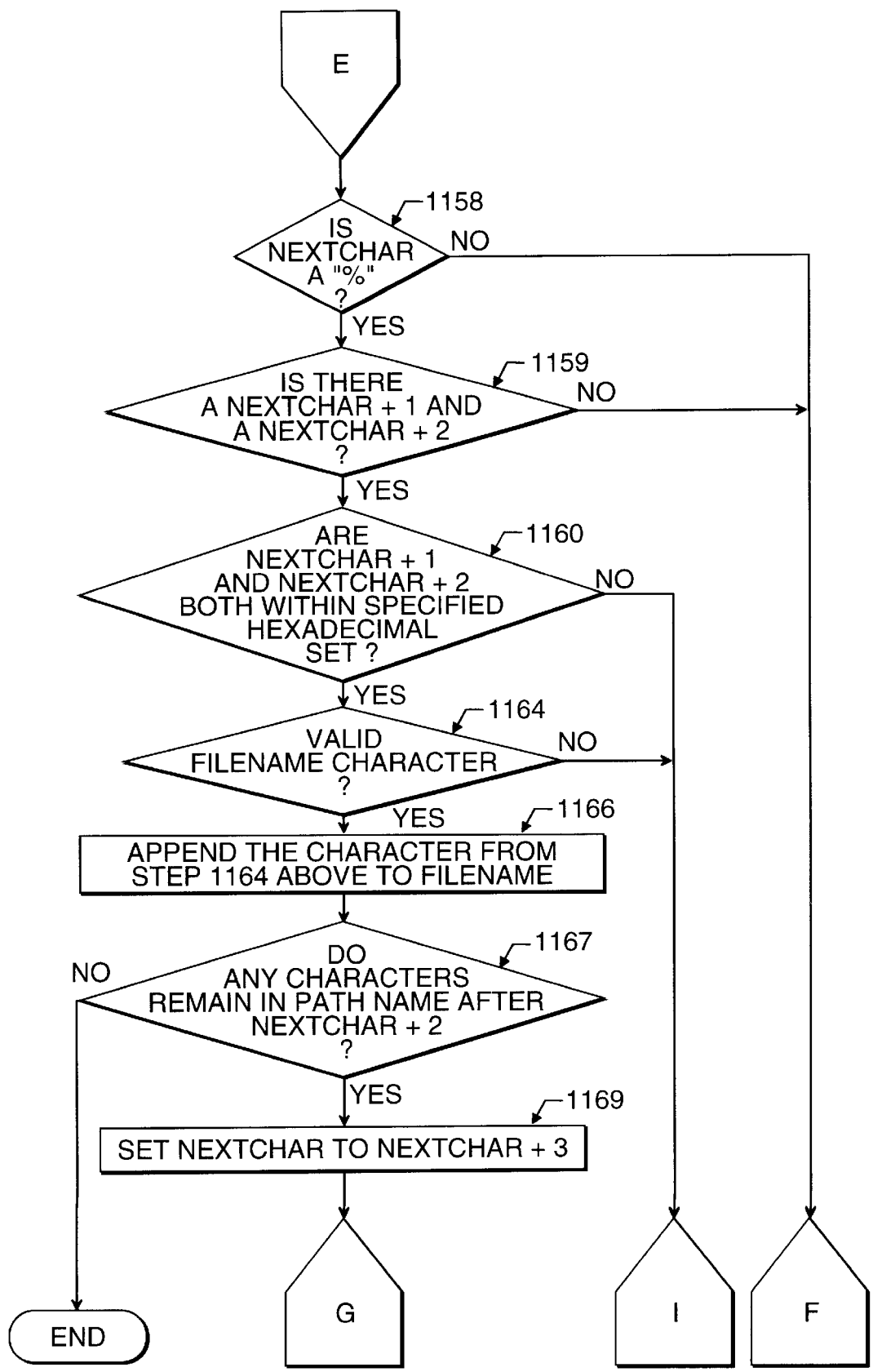
Figure 11E:
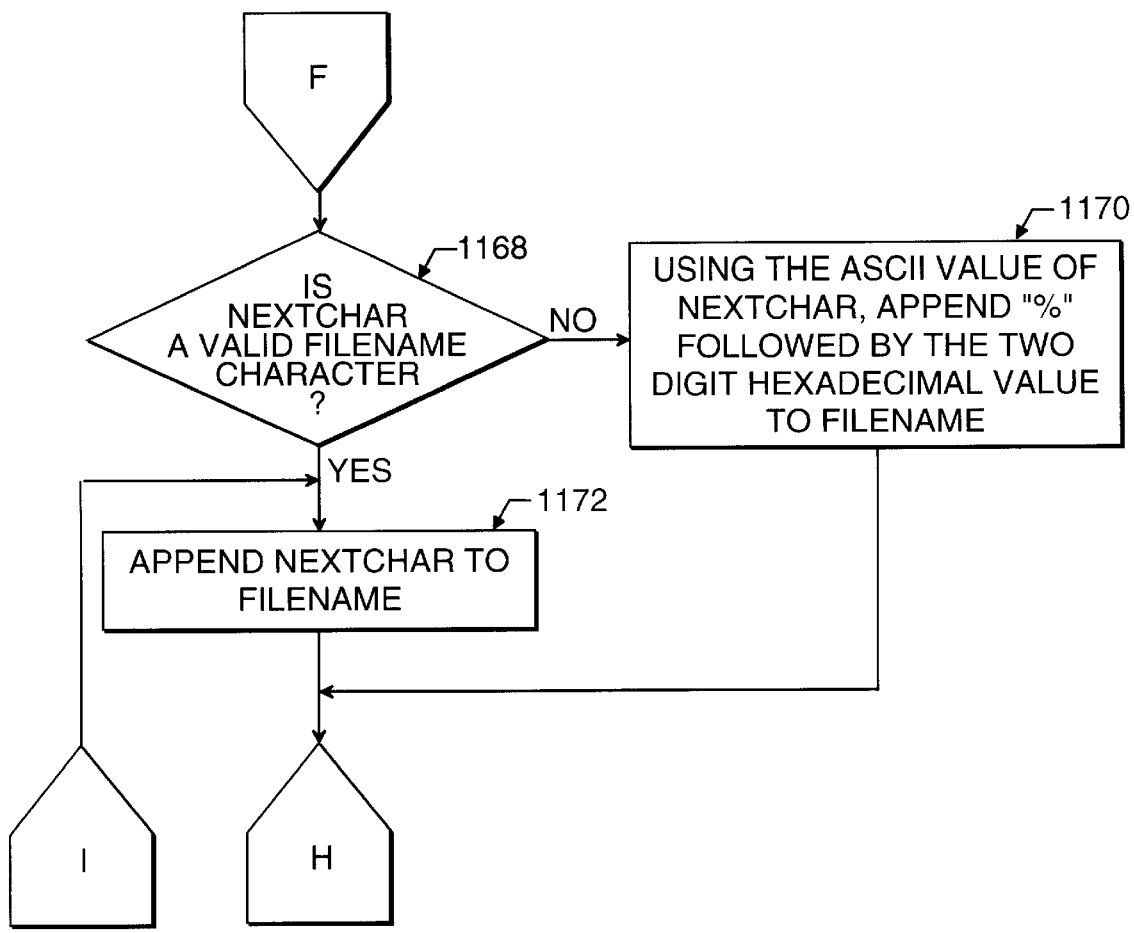

As noted above, a directory structure is created on the client computer 200 that is substantially identical to the hierarchical tree structure on the remote network device from which the stored web pages were retrieved. Any known process for creating the local directory may be used. A directory procedure may be used that creates a main directory and a plurality of subdirectories, identical to the remote tree structure, for the stored web pages. The directory procedure executes during the CFHD process by first reviewing the URLs of the downloaded web pages as received by the client computer 200, and then dynamically creating an appropriate local directory structure. FIGS. 11C–11E show one directory creation process that may be used to create such local directory structure.

Specifically, at step 1140, a variable "filename" is set to a base directory in the memory of the client computer 200. At step 1142, a "\" and then a protocol name (e.g., HTTP) is appended to filename. Similarly, at step 1144, a "\" and then the host name is appended to filename. A "\" then is appended to filename at step 1146. A variable "nextchar" then is set to the first character in the "document path name" (step 1148). The document path name is the part of the URL that is located after the host name. At step 1150, it then is determined whether any characters remain in the path name. If none remain, the process ends. If characters do remain, then it is ascertained at step 1152 if nextchar is a "/." If yes, a "\" is appended to filename at step 1154. It then is determined if any characters remain at step 1155. If none remain, the process ends. If characters do remain, then the variable nextchar is set to the next character in the path name (step 1156). The process then loops back to step 1150 to ascertain if any characters remain in the path name.

Alternatively, if at step 1152 nextchar is not a "/", the process continues at off-page connector "E." From off page connector "E", it then is ascertained at step 1158 if nextchar is the character "%." This is important to determine because a character may be represented in ASCII form by a "%" character and two successive hexadecimal numbers. Therefore, if nextchar is not a "%", the process continues with off page connector "F." If nextchar is a "%", it then is ascertained if there is a nextchar +1 and a nextchar+2 (step 1159). If such characters do not exist, the process continues to off page connector "F." If such characters do exist, it then is ascertained at step 1160 if nextchar+1 and nextchar +2 are both within the hexadecimal set [0–9, lower case a–f, and A–F]. If not, the process continues to step 1172 via off page connector "I." If yes, it then is ascertained at step 1164 if, when treating nextchar +1 followed by nextchar +2 as a two-digit hexadecimal number, the character whose ASCII value equals such number is a valid file name character. If not a valid file name character, the process continues to step 1172 via off page connector "I." If a valid file name character, the character from step 1164 above is appended to filename (step 1166). It then is determined if any characters remain in the path name (step 1167) after nextchar +2. If none remain, the process ends. If characters do remain, then nextchar is set to nextchar +3 (step 1169). The process then loops back to step 1152, via off page connector "G", to ascertain if nextchar is a "/."

If, in step 1158, a determination is made that nextchar is not a "%" character, it then is ascertained at step 1168 if nextchar is a valid file name character. If not, then using the ASCII value of nextchar, a "%" followed by the two digit hexadecimal value is appended to filename at step 1170. The process then loops back to step 1156 to set nextchar to the next character in the path name. If at step 1168 the result is positive, the process continues to step 1172 where nextchar is appended to filename. The process then loops to step 1156 via off page connector "H.".

Using the above directory creating process, an exemplary URL "hftp://etpc.hq.altav.com/root/look at this.html" is converted to a directory structure with a root directory of "cachebase" as follows:

"cachebase\http\etpc.hq.altav.com\root\ look%20at%20this.html".

Locally stored web pages may be accessed through a browser by conventional means, such as by selecting an "open" button, or by selecting a bookmark. Selection of a bookmark causes the computer to display the first web page (i.e., the root web page in the tree) on the display 270. A user may traverse through a stored directory structure in the same manner that such user would traverse through the analogous tree structure on the remote network device from which the stored web pages originated. In the event that a web page is selected that was not stored on the local computer (such as a web page at a higher level than the first web page), the client computer 200 will display indicia indicating that the selected web page is not stored locally. For example, the client computer 200 may display the text "the selected web page is not stored in local memory" when a web page that was not stored on the client computer 200 is selected. When viewing a stored web page, additional indicia may be displayed indicating that the viewed web pages were retrieved from the memory in the client computer 200 and not from the remote network site. Since the interceptor 394 intercepts browser requests to display web pages and automatically selects an appropriate source for the pages, the retrieved web pages may be viewed either when the client computer 200 is disconnected from or connected to the network 295.

As a supplement to the CFHD process, a mechanism may be included to download into non-volatile memory each web page from the remote web site that was accessed by the browser 399 en route to the root web page. For example, a user may have traversed two web pages to get to a selected root web page. Accordingly, the two accessed, higher level web pages are downloaded into the client computer memory, in addition to the web pages saved by selecting the CFHD button 400.

The function of pointers (i.e., hyperlinks) that are a part of web pages downloaded in the client computer 200 from the remote web site also can be maintained. More particularly, when the computer system 200 is disconnected from the network 295, a user may move between downloaded web pages by selecting hyperlinks on image map files that are a part of displayed web pages. To that end, a local graphical image mapping table preferably is created in the client computer 200. The mapping table associates (i.e., maps) one or more sections of a graphical image produced by an image map file (on a downloaded web page) with one or more locally stored web pages. The local image mapping table may be a relational database having the fields, "coordinates on image map" and "local URL." During disconnect, a selection of any part of the graphical image causes the client computer 200 to access the local image mapping table. This enables the client computer 200 to locate and display the web page associated with the selected part of the graphical image.

Figure 12:
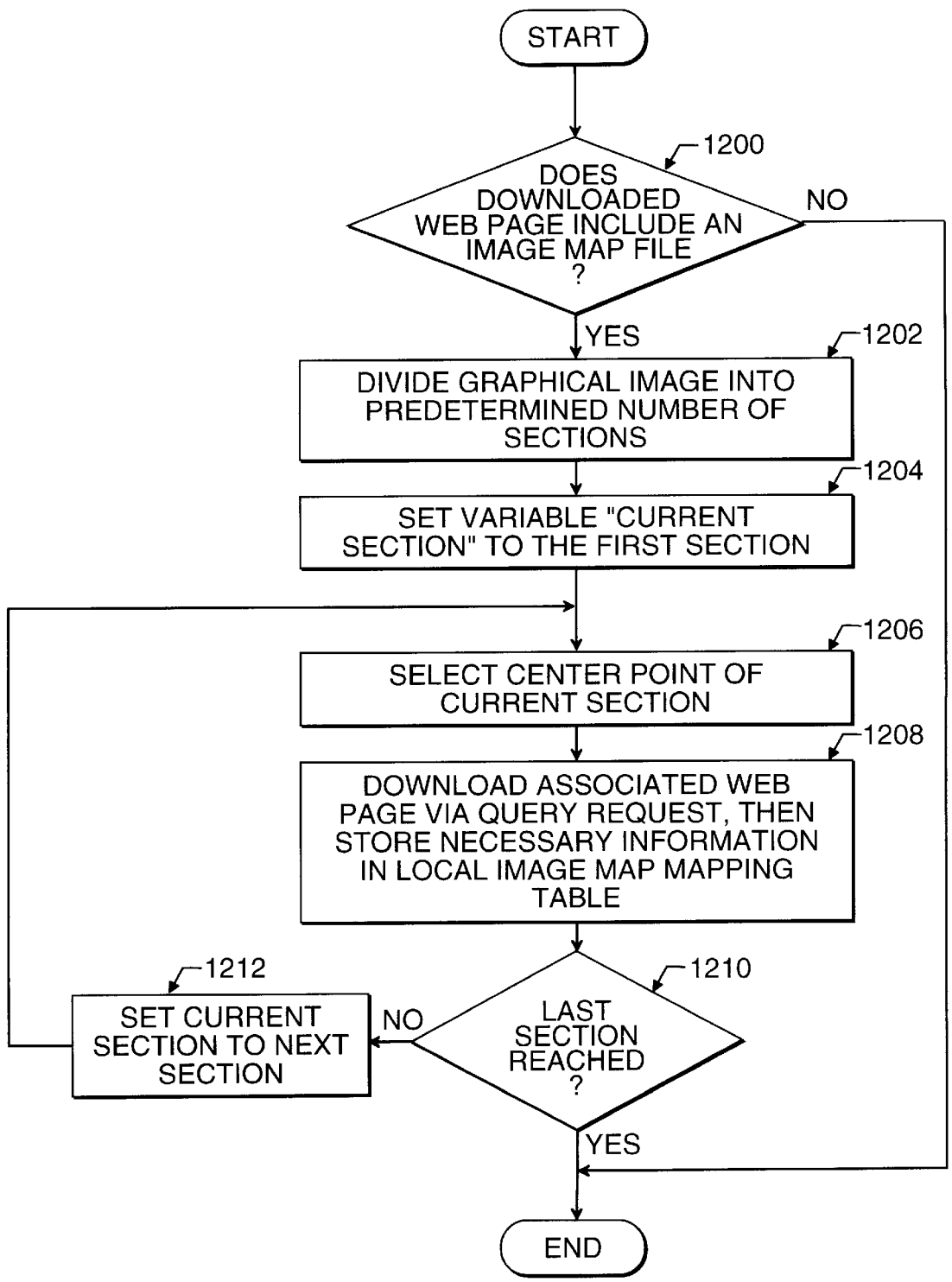
FIG. 12 is a flow chart illustrating a process for creating a local image map mapping table.

A process for creating the local image mapping table is shown in FIG. 12. This process may be initiated by the interceptor 394 either while browsing remote network sites, or when the CFHD button 400 is selected. Similar to the CFHD process, the preferred process of creating the local image mapping table is a background process and thus, does not interrupt the normal execution of the browser 399 or other applications on the system.

The preferred process for creating the local image mapping table begins at step 1200 by ascertaining whether the HTML code of a downloaded web page includes an image map file. This may be done by scanning for an ISMAP tag in the HTML code. The process ends if the web page does not include such a file. If the web page does include an image map file, the graphical image displayed by the image map file then is divided into a predetermined number of sections at step 1202. The sections preferably are square in shape and should collectively encompass the entire graphical image of the image map file. Although there may be a default number of sections, the user may preset either the number of sections or the size of the sections by means of the configure button 402. The variable "current section" then is set at step 1204 to the first section of the graphical image. The center point of the current section then is examined (by the background process) at step 1206. Although the center point preferably is selected, any other point in the sections could be examined to create the local image mapping table.

The client computer 200 then sends a query request, to the remote network device, that includes the selected coordinates of the graphical image (step 1208). In response to this query request, the remote network device uploads, to the client computer 200, the web page (i.e., a response) associated with the selected point. The client computer 200 then stores the URL of the downloaded web page and the coordinates of the current section of the graphical image in the local image mapping table (step 1208). It then is ascertained at step 1210 if the last section has been reached. If it has been reached, the process ends and the local mapping table is fully formed. If the last section has not been reached, then the current section variable is set to the next section in step 1212. The process then loops back to step 1206 to select the center point of the current section.

Accordingly, a user's selection of any point of a graphical image produced by an image map file on a displayed web page causes the interceptor 394 to ascertain if the client computer 200 is connected to the network 295. If the client computer 200 is not connected to the network, the interceptor 394 causes the client computer 200 to access the local image mapping table to ascertain if there is a stored web page associated with the section of the graphical image that was selected. If there is a stored web page associated with such section, its URL in the mapping table is used to fetch such web page from the local directory structure for display on the display 270.

The client computer 200 also may be enabled to first download a copy 1304 of a remote network document 1306 (e.g., a database) from an origin server 1310 ("origin server 1310"), and then modify the (database) copy 1304 while disconnected from the network 295. Upon reconnect to the network 295, the client computer 200 then may update the remote (database) document 1306 to reflect the changes made by the client computer 200 during disconnect. This enables the user to modify such a database during disconnect while automatically ensuring that such modifications will be made to the remote (database) document 1306 upon re-connect.

Figure 13:
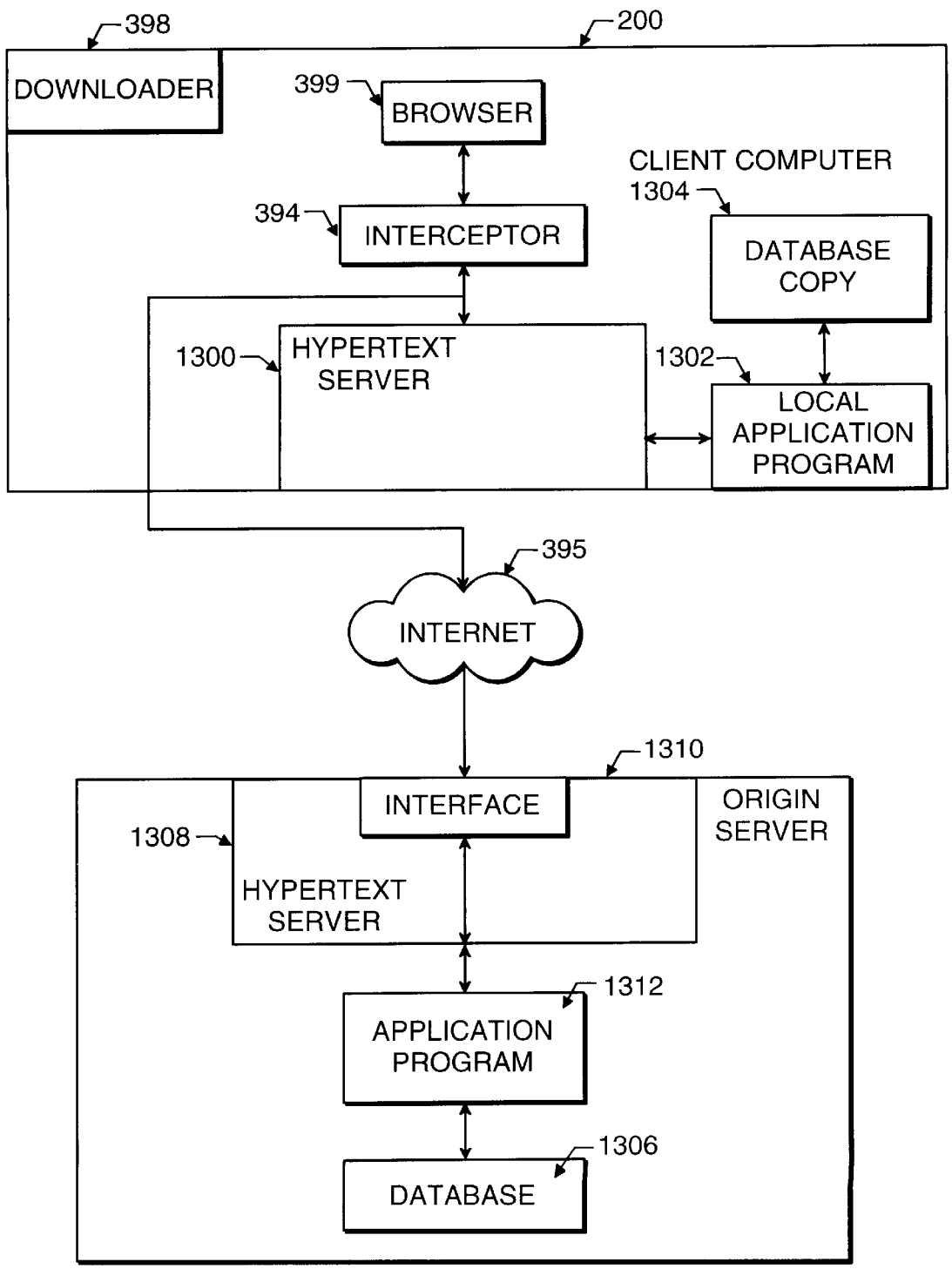
FIG. 13 is a block diagram of a network configuration that may utilize a local interface specification at a client computer.

To that end, as shown in FIG. 13, the client computer 200 may include a local hypertext server 1300 for formatting data received from the interceptor 394 into a selected interface format, a local application program 1302, which is compatible with the database and receives formatted information from the hypertext server, and a downloader 398 for downloading, prior to disconnect, a local copy 1304 of the database 1306 onto the client computer 200 from the remote network device. The local application program 1302 is a substantial duplicate of the application program 1312 on the origin server 1310. In addition, program 1302 may be either downloaded with the local copy 1304, preloaded into the memory of the client computer 200, or otherwise accessible by the client computer 200 during disconnect. The interface format may be any known interface format such as, for example, Common Gateway Interface (CGI), Internet Server Application Program Interface (ISAPI, co-developed by Microsoft Corporation and Process Software Company), or JAVA Applet (developed by Sun Microsystems). CGI is discussed in more detail in "The WWW Common Gateway Interface", version 1.1, in Internet draft form, dated Feb. 16, 1996, by DRT Robinson.

Accordingly, during disconnect, requests from the browser 399 to modify the database are intercepted by the interceptor 394. Such request may include data from a template. The interceptor 394 responsively determines that the client computer 200 is disconnected from the network, and then directs the request to the local hypertext server. The local hypertext server responsively translates the request and transfers the data (from the template) to the local application program to modify the locally stored database copy. This process is done completely while disconnected from the network 295 and thus, does not require access to the hypertext server 1308 on the origin server 1310. Moreover, this process is a background process and thus, does not interrupt the execution of the browser. The modifications to the database copy 1304 then may be made to the database 1306 on the origin server 1310 upon reconnect.

Figure 14:
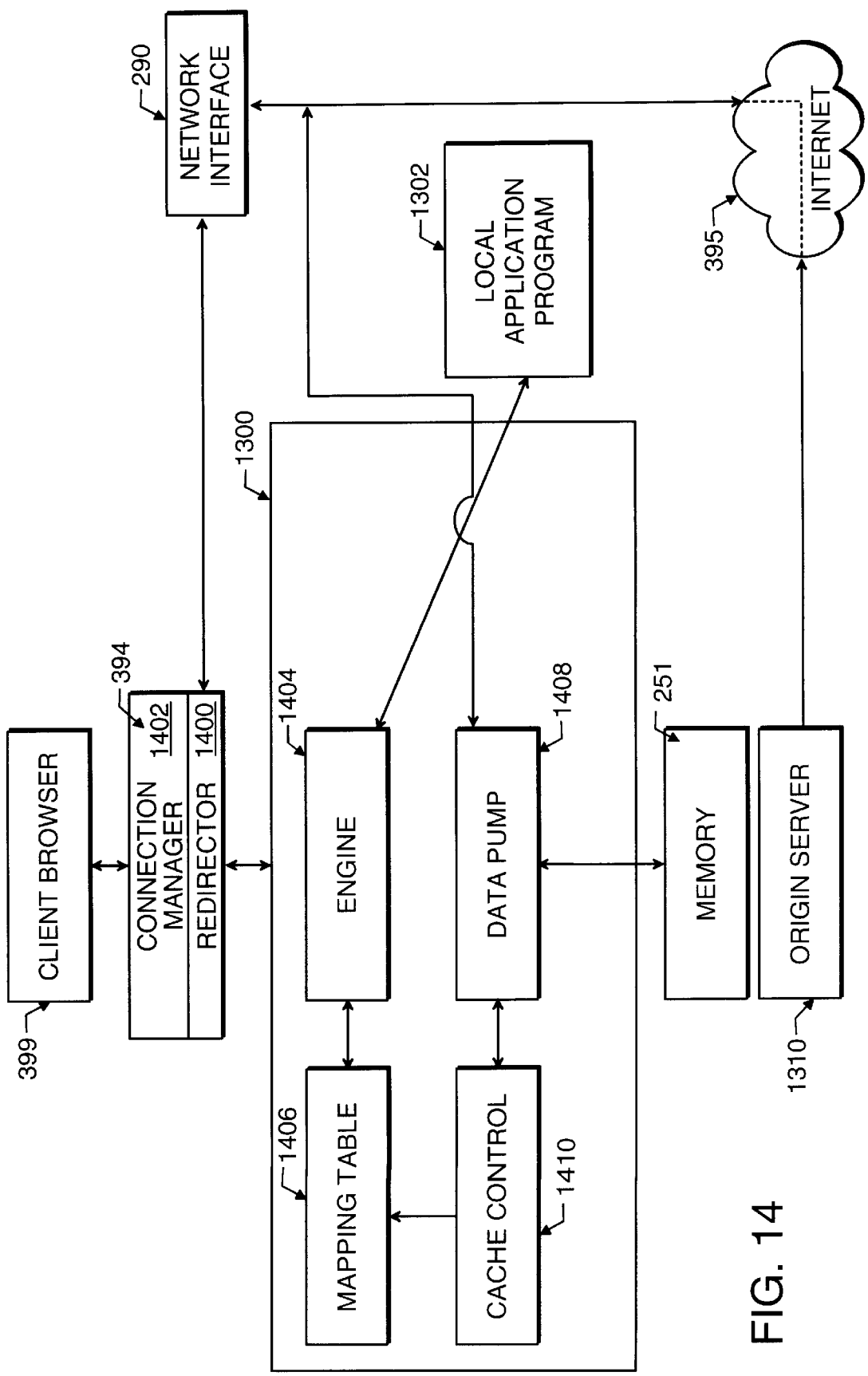
FIG. 14 is a block diagram of the local interface specification on the client computer.

More particularly, FIG. 14 is a block diagram of the local hypertext server 1300 stored on the client computer 200 in relation to the interceptor 394. The local hypertext server 1300 may include the following elements:

an engine 1404 for performing the interfacing functions of an interface;

a directory mapping table 1406 for storing the location of the database copy 1304 within the directory structure of the client local computer;

a data pump 1408 for downloading the database 1306 from the origin server 1310; and a cache control 1410 for causing the data pump to download the database from the origin server 1310 to the client computer 200.

The interceptor 394 may include the following elements:

a redirector 1400 for receiving browser requests and directing specified requests to the local hypertext server; and a connection manager 1402 for determining if the client computer 200 is connected to the network 295.

Figure 15:
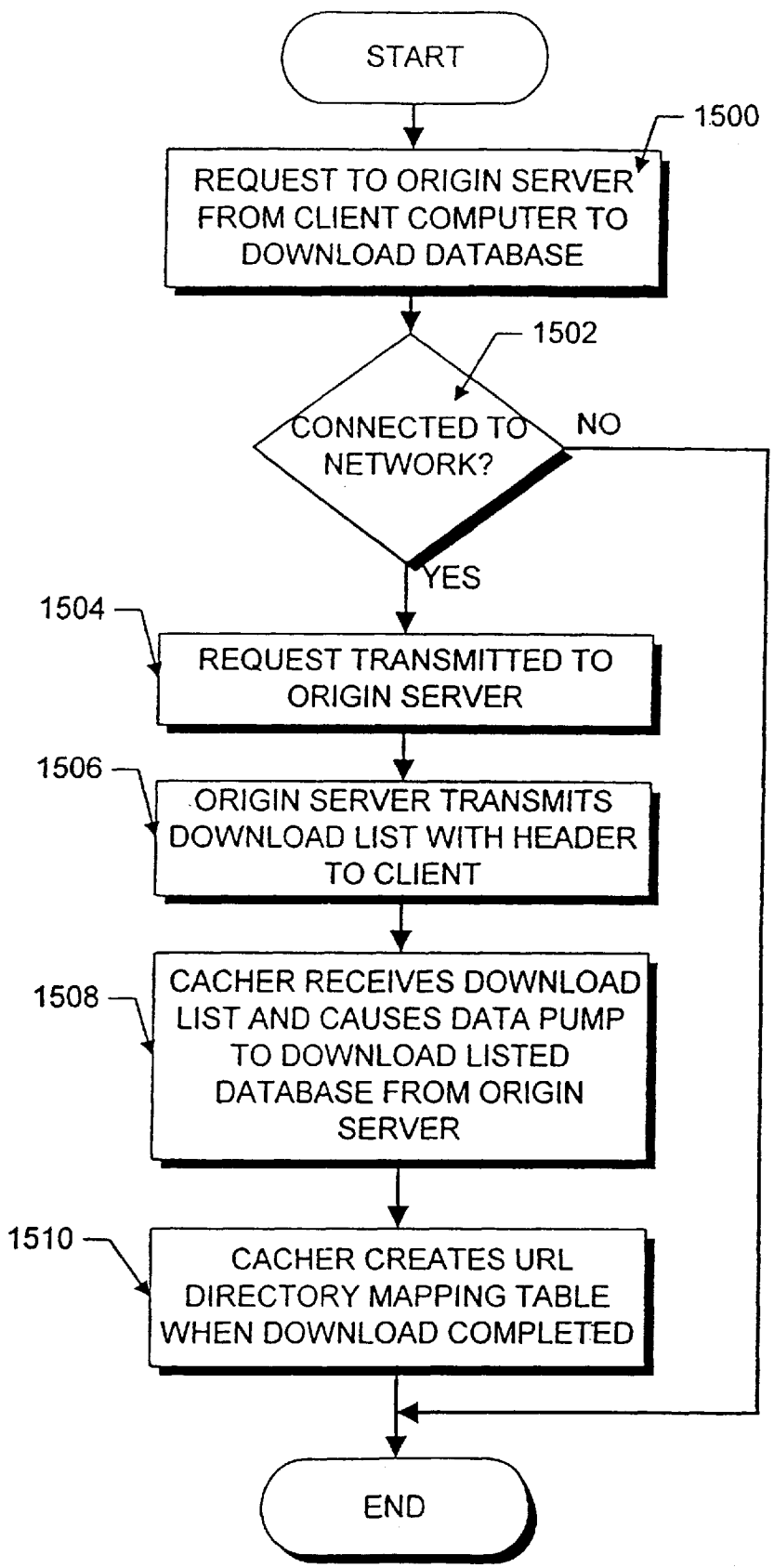
FIG. 15 is a flow chart illustrating a process for downloading a database from an origin server.
Figure 16:
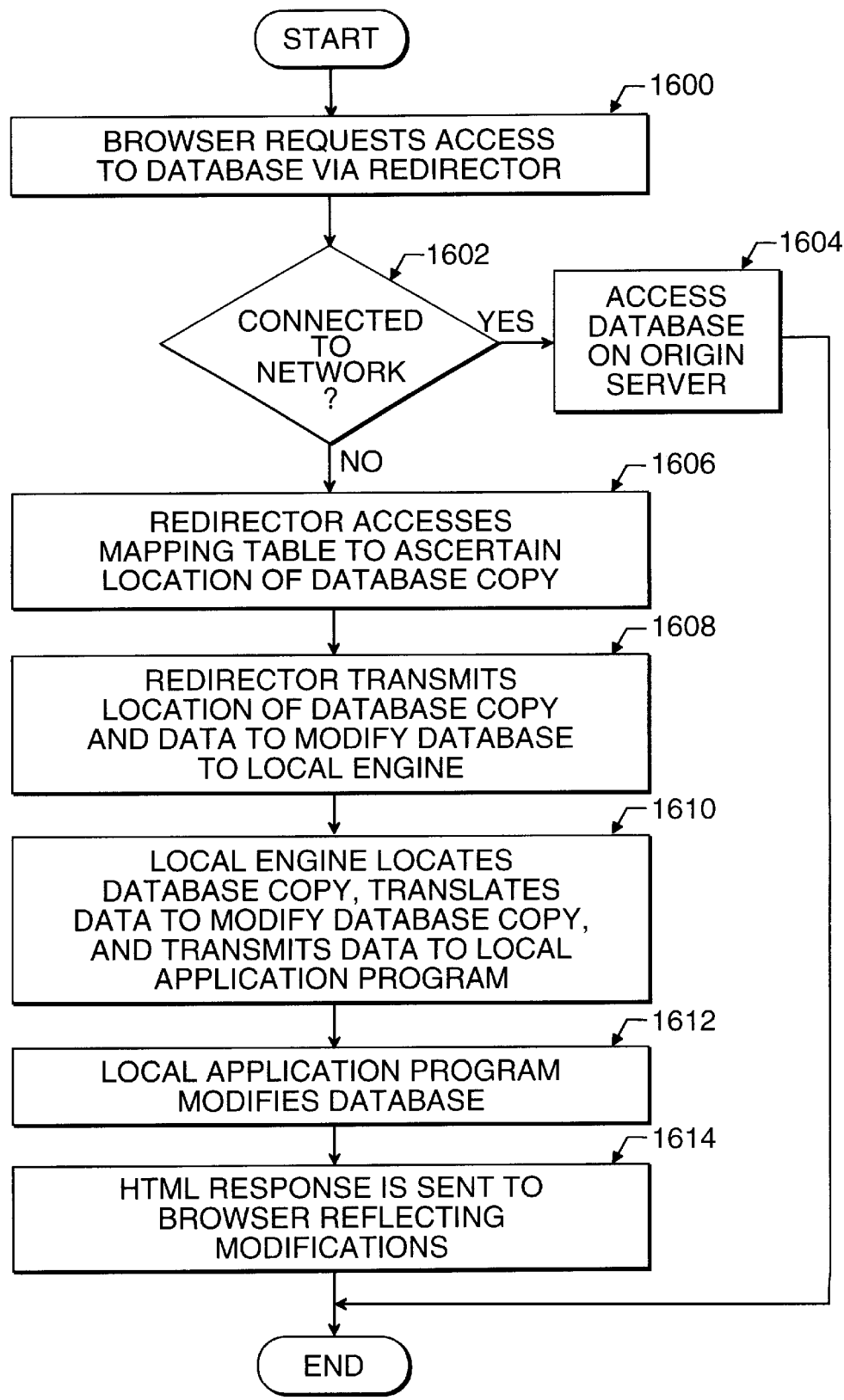
FIG. 16 is a flow chart illustrating a process for accessing and modifying a downloaded database.

The function of each of these elements are more fully understood with reference to FIGS. 15 and 16. FIG. 15 is a flow chart illustrating a process for downloading the database 1306 from the remote network device, and FIG. 16 is a flow chart illustrating a process for accessing and modifying the downloaded database copy 1304 of the database.

With reference to FIG. 15, the process begins at step 1500 in which the browser 399 on the client computer 200 requests that the database 1306 be downloaded from the origin server 1310. This request is intercepted by the interceptor 394, which determines if the client computer 200 is connected to the network. The function of the interceptor 394 is effected here by the redirector 1400 and the connection manager 1402. At step 1502, the connection manager 1402 determines if the client computer 200 is connected to the network 295. If disconnected, the process ends because the database 1306 cannot be downloaded. If connected to the network 295, the interceptor 394 transmits the request to the origin server 1310 (step 1504). The origin server 1310 responds at step 1506 by transmitting a list, having a "mime" header, to the client computer 200. The list then is transmitted to the cache control 1410 (step 1508) that first determines from the list which databases will be downloaded, and then causes the data pump 1408 to begin downloading a copy of each of the databases in the list. After the database copy 1304 is downloaded, the cache control 1410 creates a directory mapping table (if not already created) having fields "URL" and "location in local directory structure" (step 1510). The cache control 1410 then adds data to the directory mapping table, thereby providing the information for creating a client directory structure, if necessary, in the client computer 200 that is similar to the hierarchical tree structure on the origin server 1310. The client directory structure may be created by conventional means.

Once the database copy is downloaded into the client directory structure and its location is stored in the directory mapping table, the client may access and modify the database copy with the client browser 399 while disconnected from the network 295. FIG. 16 thus shows a process of accessing and modifying the downloaded database copy in the client computer 200 when disconnected. Specifically, after data is entered into the templates, the browser 399 first requests access to the database 1306 via the interceptor 394 and the redirector 1400 (step 1600). The redirector then queries the connection manager 1402 at step 1602 to determine if the client computer 200 is connected to the network 295. If connected to the network 295, the database 1306 on the origin server 1310 is accessed and modified, by conventional means, over the network 295 (step 1604).

If the client computer 200 is not connected to the network 295, the redirector 1400 accesses the mapping table 1406 to ascertain the location of the database and local application program in the client directory structure (step 1606). The redirector 1400 then transmits the location of the local application program 1302, database copy 1304, and the data to modify the database copy 1304 to the local engine 1404 at step 1608. The local engine 1404 then locates the database copy 1306 and local application program, translates the data, and then transmits the translated data to the local application program 1302, (step 1610). The application program 1302 then modifies the database at step 1612 and responsively sends an HTML response to the browser 399 reflecting the modifications (step 1614). Upon reconnect, the data pump 1408 may upload the modified database to the origin server 1310 to reflect the changes made in the database.

In the preferred embodiment, which is implemented using CGI, the cache control 1410 may access a plurality of functions to modify the mapping table 1406. Among those functions are:

addCGIcacheEntry(CString cURL, CString cDirectory);
removeCGIcacheEntry(CStringcURL);
mapCache(CString cURL, CString & cResult);
findCGIcacheEntry(CStringcURL);
getCGIcacheEntry(intnIndex, CString cURL, CString & cDirectory);
getCGIcacheCount();
readCGIcacheList(); and
writeCGIcacheList();

Each function is briefly discussed below:

The function "addcache Entry" creates a new directory entry on the client computer 200 that represents a remote (CGI) application, given the URL string and the root directory. It is assumed that the full root directory path is specified in the cDirectory parameter passed to this routine, and that cURL is the standard reference to the application on the remote server. An example of the input parameter for cURL could be "//www.server1.com/~alias/aca~1/dispatch.cgi", where www.server1.com is the remote address of the server, "/~alias/aca~1/" is a directory specification on the server and "dispatch.cgi" is the CGI application to run. An example of the input parameter for cDirectory might be "C:\WIN32APP\WGWF\", which identifies the root directory for all mapped entries. The result of this function is that an entry is created in the directory mapping table, and an associated directory is created that is used to contain files required to locally download the remote CGI application specified. The database mapping created for the above example, having a URL of:
"HTTP://www.server1.com/~alias/aca~1/dispatch.cgi"maps to the directory:
"C:\WIN32APP\WGWF\WWW.SERVER1.COM\~ALIAS\ACA~1\."on the local system when disconnected.

The function "removeCGIcacheEntry" enables the cache control 1410 to remove a "URL to directory" mapping in the directory mapping table given cURL, where cURL is the specific URL map entry. If there is no matching URL, the request returns an error. If a URL exists in the database mapping table, it is removed.

The function "mapCache" is used by the redirector to search the directory mapping table for matching the passed cURL to an existing entry. If a match is found, the directory mapping is returned using cResult. This routine is used when the client computer 200 is disconnected to determine if the remote request can be satisfied by a stored CGI entry. If cResult returns non-zero, an entry exists and the request is directed to the engine with a SCRIPT_NAME environment parameter pointing to the local application as a result of this mapping. An example of the input parameter for the URL could be "//www.server1.com\-alias/aca-1/dispatch.cgi." If a match existed, an example of the output parameter for cResult might be "C:\WIN32APP\WGWF\WWW\V.SERVER1.COM\-ALIAS\ACA-1\DISPATCH.CGI." The URL has been mapped to a local directory, and the executable file DISPATCH.CGI has been parsed and appended to the directory specification.

The functions "findCGIcacheEntry," "getCGIcacheEntry" and "getCGIcacheCount" are enumeration routines used by the graphical user interface of the application to display and manage information in the directory mapping table.

The functions "readCGIcacheList" and "writeCGIcacheList" are low level routines used to read and write the basic objects used in the directory mapping table.

After the database copy is modified and the client is reconnected to the network 295, the client computer 200 may access the server again and modify the database to reflect the data added, removed, or modified during disconnect (database transaction). This may be done by conventional methods, such as by means of a reconciliation engine to update the database, or by directly overwriting the database on the origin server 1310.

When the hypertext server 1300 is in use, a user of the client computer 200 connects to the origin server 1310, via the network 295, and accesses a application program associated with the database. The interface associated with that application program may include a "download" button which, when selected by the client user, causes the database and associated origin server 1310 directory structure to be downloaded from the origin server 1310 to the client computer 200. A status bar may be displayed by the client computer 200 during the download. The user then may disconnect from the network 295 and modify the database copy via the local application and the browser 399 in a manner that is substantially identical (to the user) to when the client computer 200 is connected to the network. Access through the browser 399 is necessary in all CGI application programs, for example, designed for the World Wide Web because such applications frequently do not have a user interface. Specifically, the CGI application "standard in" (a part of each application program that specifies from where data may be received; for example, a keyboard or a mouse) often may be set to receive input from the hypertext server only which, in this example, receives input from the browser 399. Data to update the database copy may be entered into one or more templates displayed by the browser 399. Once the data is entered into the templates, the user may select a "submit" button, for example, that enters the data into the database copy. Upon reconnect, the modifications to the database copy are automatically made to the database on the origin server 1310. Accordingly, the database may be maintained locally while disconnected from the network 295.

It should be understood, however, that use of the hypertext server 1300 may be practiced with other types of remote documents, such as word processor or spread sheet documents. Accordingly, maintenance of a database is discussed here for exemplary purposes and is not intended to limit its scope. It also should be noted that although many embodiments of the system have been discussed with reference to World Wide Web pages, the system may be practiced with various other types of documents. Moreover, although CGI is disclosed as the preferred embodiment, it should be understood that the disclosed system may be utilized with any known interface format specification, such as those previously mentioned. The above discussion of CGI was exemplary only and therefore should not be considered a limitation of the interface system.

The system may be managed by conventional means. One such means is a graphical user interface listing the downloaded web pages and the aspects of the system applied to each of those web pages.

In an alternative embodiment, the system may be implemented as a computer program product for use with a computer system. Such implementation may include a series of computer instructions fixed either on a tangible medium, such as a computer readable media (e.g., diskette 242, CD-ROM 247, ROM 215, or fixed disk 252 as shown in FIG. 2) or transmittable to a computer system, via a modem or other interface device, such as communications adapter 290 connected to the network 295 over a medium 291. Medium 291 may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network 295 (e.g., the Internet or World Wide Web).

Each of the graphical user interfaces discussed above may be constructed by conventional software programming techniques known in the art. It is preferred that the GUIs be constructed by visual builders.

Although various exemplary embodiments of the invention have been disclosed, it will be apparent to those skill in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

1. A method of updating a local copy of an origin document, the local copy being stored in memory of a local computer system that is connectable to a network, the origin document being stored in memory of an origin network device that is connectable to the local computer system via the network, the local computer system also being connectable, via the network, to an update network device having a memory, the method comprising the steps of:

A. downloading, by the update network device, an update copy of the origin document into the memory of the update network device;

B. comparing, by the update network device, the origin document to the update copy;

C. modifying, by the update network device, the update copy when a change in the origin document is detected in step B;

D. comparing the update copy to the local copy by the update network device; and E. modifying, responsive to the step D of comparing, the local copy when the local computer system is reconnected to the network.

2. The method of updating a local copy of an origin document as defined by claim 1 wherein the step of modifying includes the steps of:

D1. deleting the update copy;

D2. downloading a new copy of the origin document into the memory of the update network device; and D3. designating the new copy of the origin document as the update copy.

3. The method of updating a local copy of an origin document as defined by claim 1 wherein the step E of modifying includes the steps of:

E1 deleting the local copy;

E2 downloading a new copy of the update copy into the memory of the local computer system; and E3 designating the new copy of the update copy as the local copy.

4. The method of updating a local copy of an origin document as defined by claim 1 wherein the steps D and E are background processes.

5. The method of updating a local copy of an origin document as defined by claim 1 wherein the origin document has an origin document last update time stamp and the update copy has an update copy last update time stamp, wherein step of comparing includes the step of:

C1. comparing the update copy last update time stamp to the origin document last update time stamp.

6. The method of updating a local copy of an origin document as defined by claim 1 wherein the origin document is a World Wide Web resource.

7. The method of updating a local copy of an origin document as defined by claim 1 further including the step of:

G. selecting an autoupdate button on a graphical user interface displayed on the local computer system.

8. The method of updating a local copy of an origin document as defined by claim 1 wherein the step B includes the step of:

B1. controlling the update network device to periodically access the origin network device.

9. The method of updating a local copy of an origin document as defined by claim 1 wherein step A includes the step of:

A1. receiving a request to maintain the local copy.

10. The method of updating a local copy of an origin document as defined by claim 1 wherein the local copy has a name and a last update time, the method further including the step of:

H. uploading a name and a last update time stamp of the local copy to the update network device.

11. The method of updating a local copy of an origin document as defined by claim 1 wherein the update copy includes a name and a last update time stamp and wherein the step B further includes the step of:

B1. updating a data structure having the name of the update copy and the last update time stamp of the update copy.

12. An apparatus for updating a local copy of an origin document, the local copy being stored in memory of a local computer system that is connectable to a network, the origin document being stored in memory of an origin network device that is connectable to the local computer system via the network, the local computer system also being connectable, via the network, to an update network device having a memory, the apparatus comprising:

a downloader for downloading an update copy of the origin document into the memory of the update network device;

a first comparator on the update network device for comparing the update copy and the origin document; and means for modifying the update copy, said modifying means modifying the update copy when the origin document is detected by the first comparator to be different than the update copy.

13. The apparatus for updating a local copy of an origin document as defined by claim 12 further including:

a second comparator for comparing the update copy to the local copy; and a second modifier for modifying, responsive to the second comparator, the local copy when the local computer system is reconnected to the network.

14. The apparatus for updating a local copy of an origin document as defined by claim 13 wherein the second modifier includes:

means for deleting the local copy;

means for downloading a new copy of the update copy into the memory of the local computer system; and means for designating the new copy of the update copy as the local copy.

15. The apparatus for updating a local copy of an origin document as defined by claim 12 wherein the first modifier includes:

means for deleting the update copy;

means for downloading a new copy of the origin document into the memory of the update network device; and means for designating the new copy of the origin document as the update copy.

16. The apparatus for updating a local copy of an origin document as defined by claim 12 wherein the origin document has an origin document last update time stamp and the update copy has an update copy last update time stamp, wherein first comparator includes:

means for comparing the update copy last update time stamp to the origin document last update time stamp.

17. The apparatus for updating a local copy of an origin document as defined by claim 12 wherein the origin document is a World Wide Web resource.

18. The apparatus for updating a local copy of an origin document as defined by claim 12 further including means for causing the update network device to periodically access the origin network device.

19. A computer program product for use with a local computer system having a memory and being connectable by a network to an origin network device having a memory and to an update network device having a memory, the computer program product updating a local document copy, stored in the local computer system memory, of an origin document stored in the origin network device memory, the computer program product comprising a computer usable medium having computer readable program code thereon, the computer readable program code including:

program code for downloading, by the update network device, an update copy of the origin document into the memory of the update network device;

first program code for comparing, by the update network device, the origin document to the update copy;

first program code for modifying, by the update network device, the update copy when the update copy differs from the origin document;

second program code for comparing the update copy to the local copy; and second program code for modifying the local copy when the local computer system is reconnected to the network.

20. The method of updating a local copy of an origin document as defined by claim 19 wherein the first program code for comparing is on the update network device.

21. The method of updating a local copy of an origin document as defined by claim 19 wherein the first program code for modifying is on the update network device.

22. The computer program product as defined by claim 19 further including:

program code for causing the update network device to interface with the origin network device.

23. The computer program product as defined by claim 19 wherein the program code for modifying includes:

program code for deleting the update copy;

program code for downloading a new copy of the origin document into the update network device memory; and program code for designating the new copy of the origin document as the update copy.

24. The computer program product as defined by claim 19 further including a second program code for modifying the local copy when the origin document is different than the update copy.

25. The computer program product as defined by claim 19 wherein the origin document has an origin document last update time and the update copy has an update copy last update time, the computer program product further including:

program code for comparing the update copy last update time to the origin document last update time.

26. The computer program product as defined by claim 19 wherein the origin document is a World Wide Web resource.

27. An apparatus for updating a local copy of an origin document, the local copy being stored in memory of a local computer system that is connectable to a network, the origin document being stored in memory of an origin network device that is connectable to the local computer system via the network, the local computer system also being connectable, via the network, to an update network device having a memory, the apparatus comprising:

a downloader for downloading an update copy of the origin document into the memory of the update network device;

a first comparator on the update network device for comparing the update copy and the origin document;

a second comparator for comparing the update copy to the local copy;

a first modifier for modifying the update copy if the origin document is different than the update copy; and a second modifier for modifying, responsive to the second comparator, the local copy when the local computer system is reconnected to the network.

28. The apparatus for updating a local copy of an origin document as defined by claim 27 wherein the second modifier includes:

means for deleting the local copy;

means for downloading a new copy of the update copy into the memory of the local computer system; and means for designating the new copy of the update copy as the local copy.

29. An apparatus for updating a local copy of an origin document, the local copy being stored in memory of a local computer system that is connectable to a network, the origin document being stored in memory of an origin network device that is connectable to the local computer system via the network, the local computer system also being connectable, via the network, to an update network device having a memory, the apparatus comprising:

a downloader for downloading an update copy of the origin document into the memory of the update network device;

a first comparator on the update network device for comparing the update copy and the origin document;

a second comparator for comparing the update copy to the local copy;

a first modifier for modifying the update copy if the origin document is different than the update copy, said first modifier including:

means for deleting the update copy;

means for downloading a new copy of the origin document into the memory of the update network device; and means for designating the new copy of the origin document as the update copy.

30. An apparatus for updating a local copy of an origin document, the local copy being stored in memory of a local computer system that is connectable to a network, the origin document being stored in memory of an origin network device that is connectable to the local computer system via the network, the local computer system also being connectable, via the network, to an update network device having a memory, the apparatus comprising:

a downloader for downloading an update copy of the origin document into the memory of the update network device;

a first comparator on the update network device for comparing the update copy and the origin document;

a second comparator for comparing the update copy to the local copy;

a first modifier for modifying the update copy if the origin document is different than the update copy; and means for causing the update network device to periodically access the origin network device.

* * * * *

UNITED STATES PATENT AND TRADEMARK OFFICE
CERTIFICATE OF CORRECTION

PATENT NO.    : 6,061,686
DATED         : May 9, 2000
INVENTOR(S)   : William Joseph Gauvin and Edward James Taranto It is certified that error appears in the above-identified patent and that said Letters Patent is hereby corrected as shown below:

<u>Title page,</u>
Item [22], after "Filed:" change "September 26, 1997" to -- June 26, 1997 --.

Signed and Sealed this

First Day of July, 2003

JAMES E. ROGAN
*Director of the United States Patent and Trademark Office*